United States Patent
Kanno et al.

(10) Patent No.: US 12,210,450 B2
(45) Date of Patent: Jan. 28, 2025

(54) MEMORY SYSTEM INCLUDING NONVOLATILE MEMORY AND METHOD OF CONTROLLING THE SAME

(71) Applicant: Kioxia Corporation, Tokyo (JP)

(72) Inventors: Shinichi Kanno, Ota (JP); Aurelien Nam Phong Tran, Yokohama (JP); Yuki Sasaki, Zhubei (TW)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/463,396

(22) Filed: Sep. 8, 2023

(65) Prior Publication Data
US 2024/0095163 A1 Mar. 21, 2024

(30) Foreign Application Priority Data

Sep. 16, 2022 (JP) ................... 2022-148046

(51) Int. Cl.
*G06F 12/00* (2006.01)
*G06F 3/06* (2006.01)
*G06F 12/02* (2006.01)
*G06F 12/1027* (2016.01)

(52) U.S. Cl.
CPC ........ *G06F 12/0246* (2013.01); *G06F 3/0617* (2013.01); *G06F 3/064* (2013.01); *G06F 3/0679* (2013.01); *G06F 12/1027* (2013.01)

(58) Field of Classification Search
CPC ............. G06F 12/0246; G06F 12/1027; G06F 2212/7201; G06F 3/061; G06F 3/0619; G06F 3/064; G06F 3/0658; G06F 3/0611; G06F 3/0617
See application file for complete search history.

(56) References Cited

U.S. PATENT DOCUMENTS

| | | | |
|---|---|---|---|
| 8,489,854 B1 * | 7/2013 | Colon ................. | G06F 12/0246 711/159 |
| 9,940,045 B2 | 4/2018 | Park | |
| 11,262,942 B2 | 3/2022 | Wu et al. | |
| 11,269,771 B2 | 3/2022 | Kim et al. | |
| 2004/0028258 A1 * | 2/2004 | Naimark ............... | G06V 10/443 382/153 |
| 2014/0101369 A1 * | 4/2014 | Tomlin ................ | G06F 12/0246 711/E12.008 |
| 2014/0195725 A1 * | 7/2014 | Bennett ............... | G06F 12/0246 711/103 |
| 2014/0223231 A1 * | 8/2014 | Mangold ................ | G11C 16/16 714/22 |

(Continued)

*Primary Examiner* — John A Lane
(74) *Attorney, Agent, or Firm* — Oblon, McClelland, Maier & Neustadt, L.L.P.

(57) ABSTRACT

According to one embodiment, in response to restoration of power to a memory system, a controller in the memory system notifies a host that the memory system is ready. When an input/output command specifying a logical address belonging to a logical address range is received, the controller selects a block corresponding to the logical address range and rebuilds, based on address translation information and an update log which are stored in the selected block, the latest address translation information corresponding to the logical address range. The controller updates the rebuilt latest address translation information, based on a list of logical addresses corresponding to lost write data, stored in the selected block.

13 Claims, 23 Drawing Sheets

(56) References Cited

U.S. PATENT DOCUMENTS

| | | |
|---|---|---|
| 2016/0154594 A1 | 6/2016 | Kang |
| 2016/0246530 A1* | 8/2016 | Mylavarapu .......... G06F 3/0688 |
| 2021/0034301 A1 | 2/2021 | Zhou et al. |
| 2022/0019364 A1 | 1/2022 | Nair |
| 2023/0289285 A1* | 9/2023 | Harris ................. G06F 12/0868 |
| 2023/0376228 A1* | 11/2023 | Cariello ................ G06F 3/0655 |

* cited by examiner

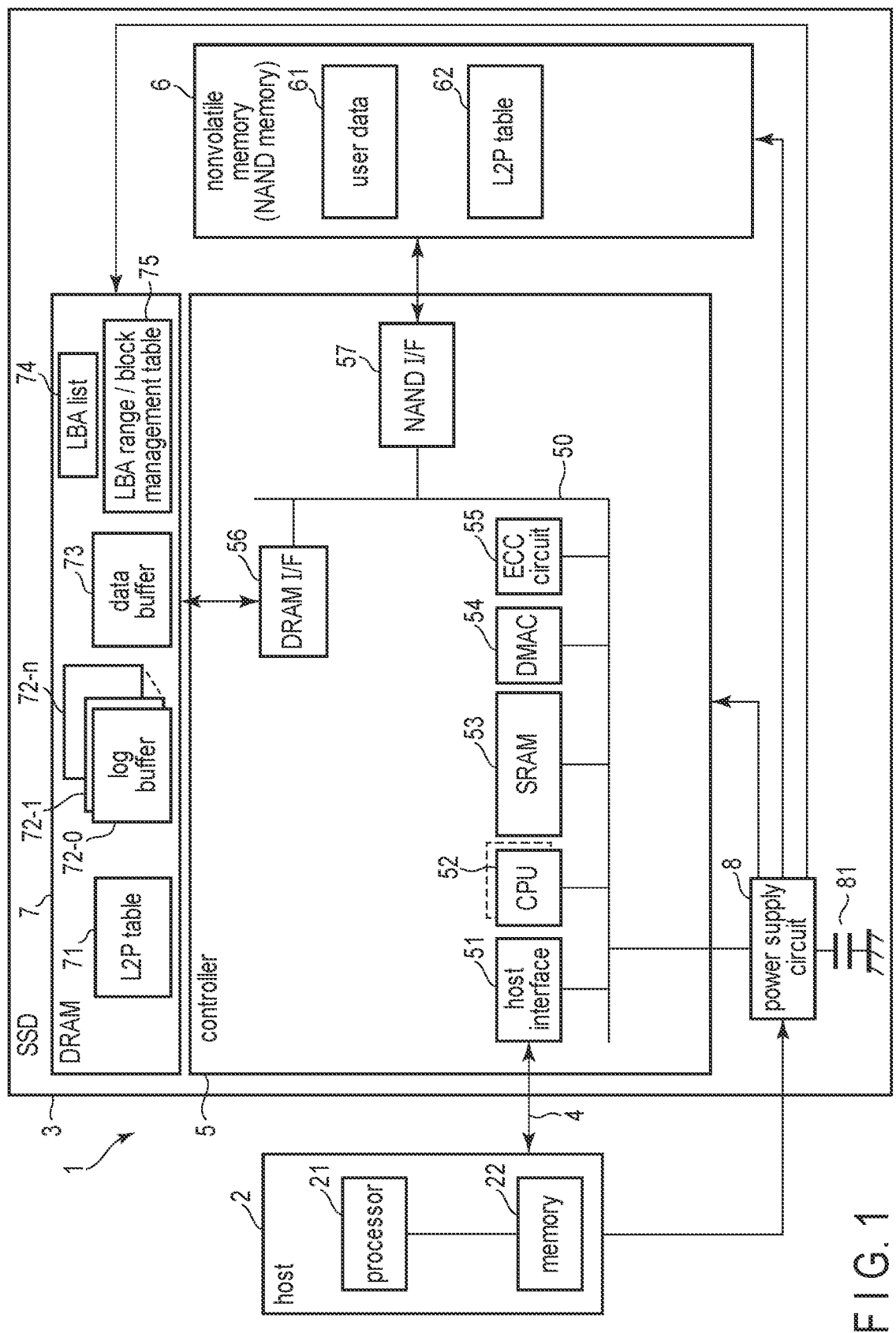
F I G. 1

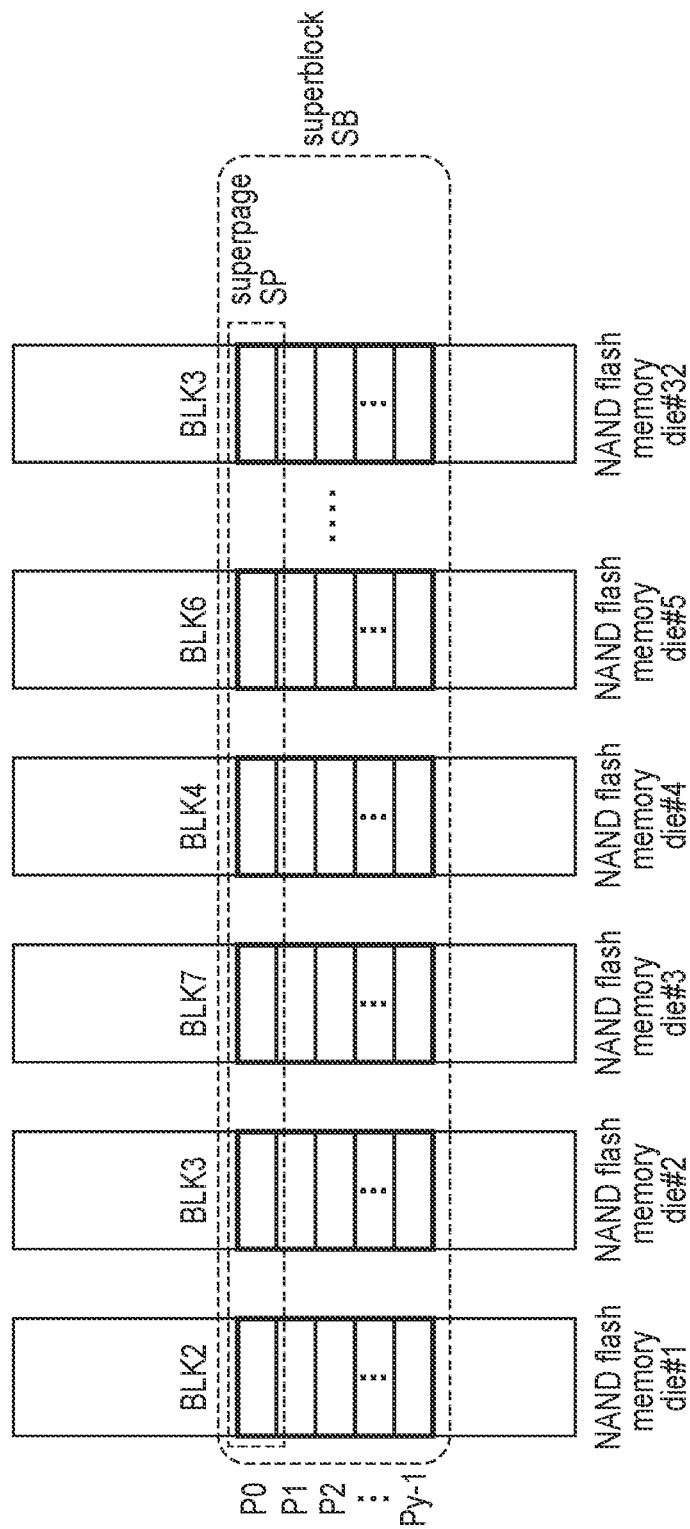
F I G. 5

| L2P fragment#0 | LBA0 | LBA1 | LBA2 | LBA3 | LBA4 | LBA5 | LBA6 | LBA7 | ... | LBA249 |
|---|---|---|---|---|---|---|---|---|---|---|
| | PBA10 | PBA11 | PBA20 | PBA50 | PBA30 | PBA12 | PBA60 | PBA61 | ... | PBA300 |

F I G. 8

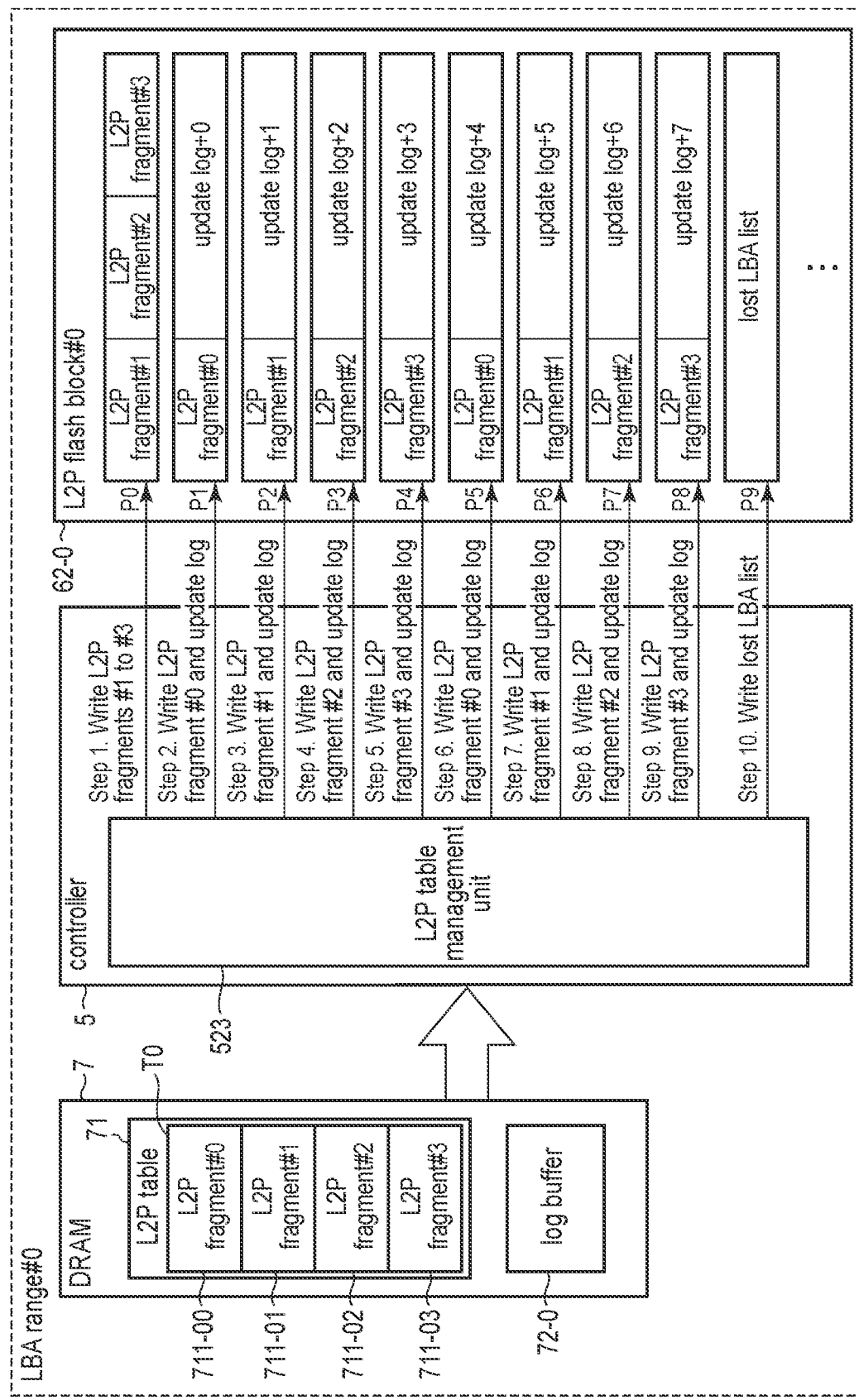
F I G. 17

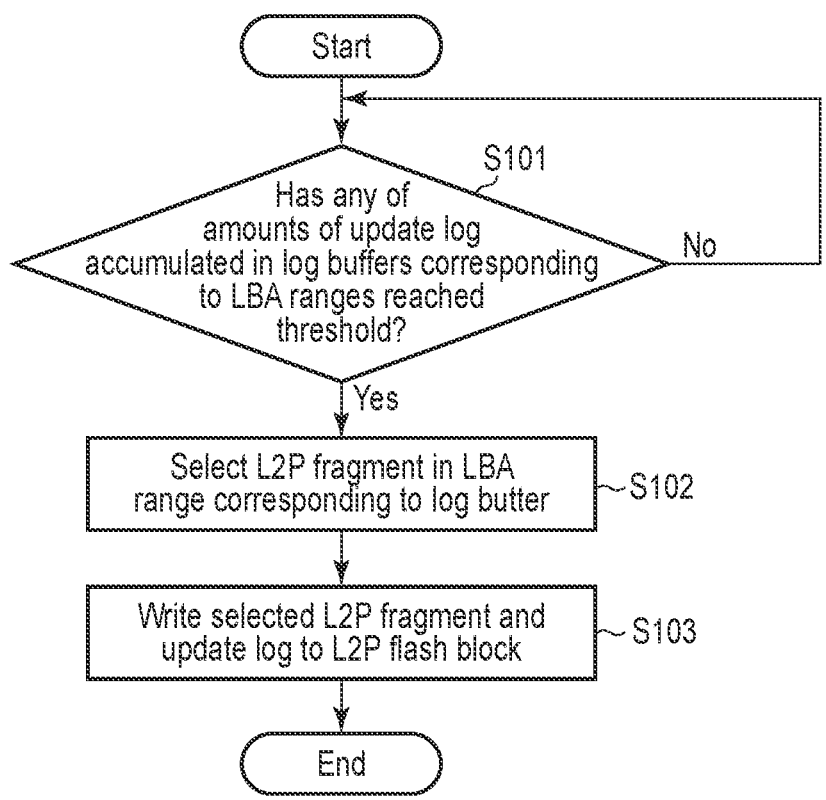
F I G. 22

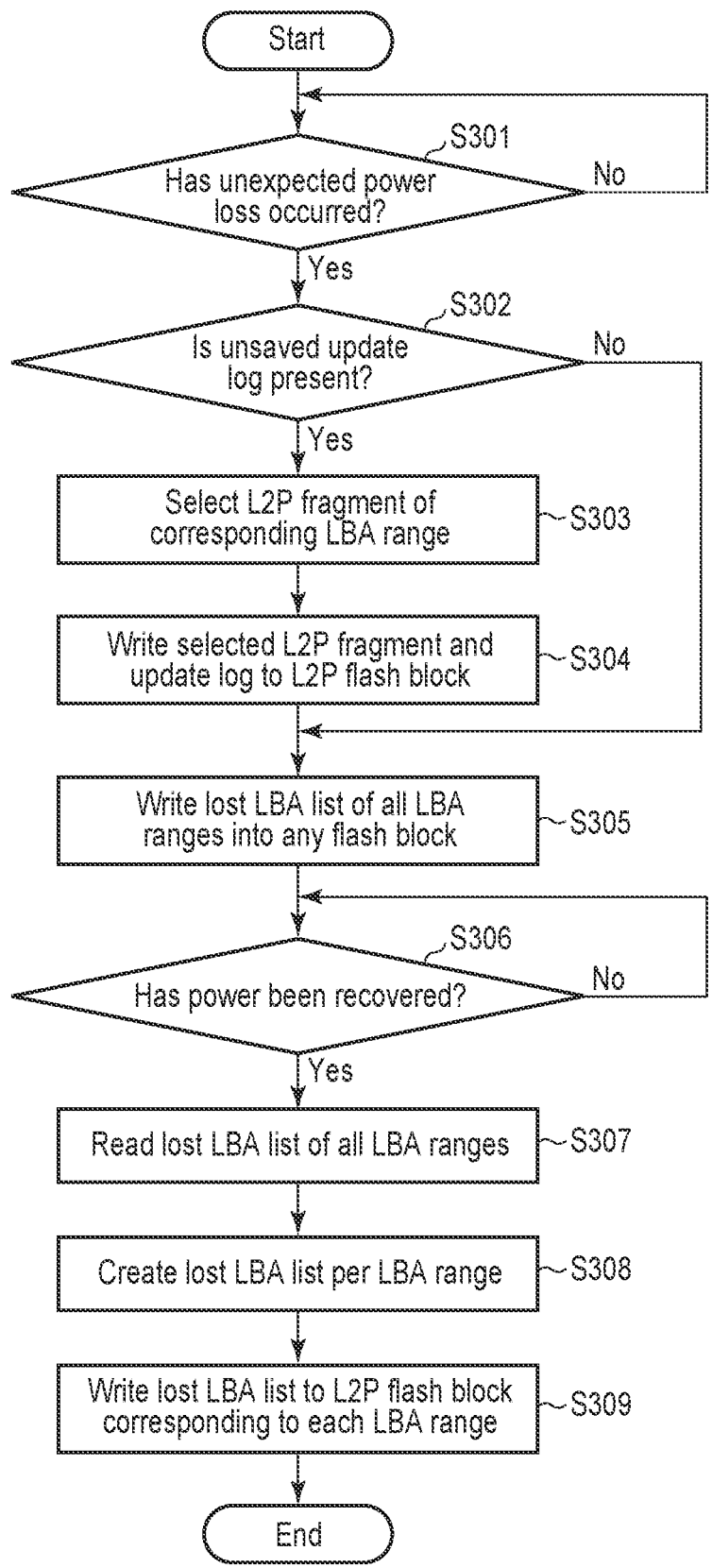
F I G. 24

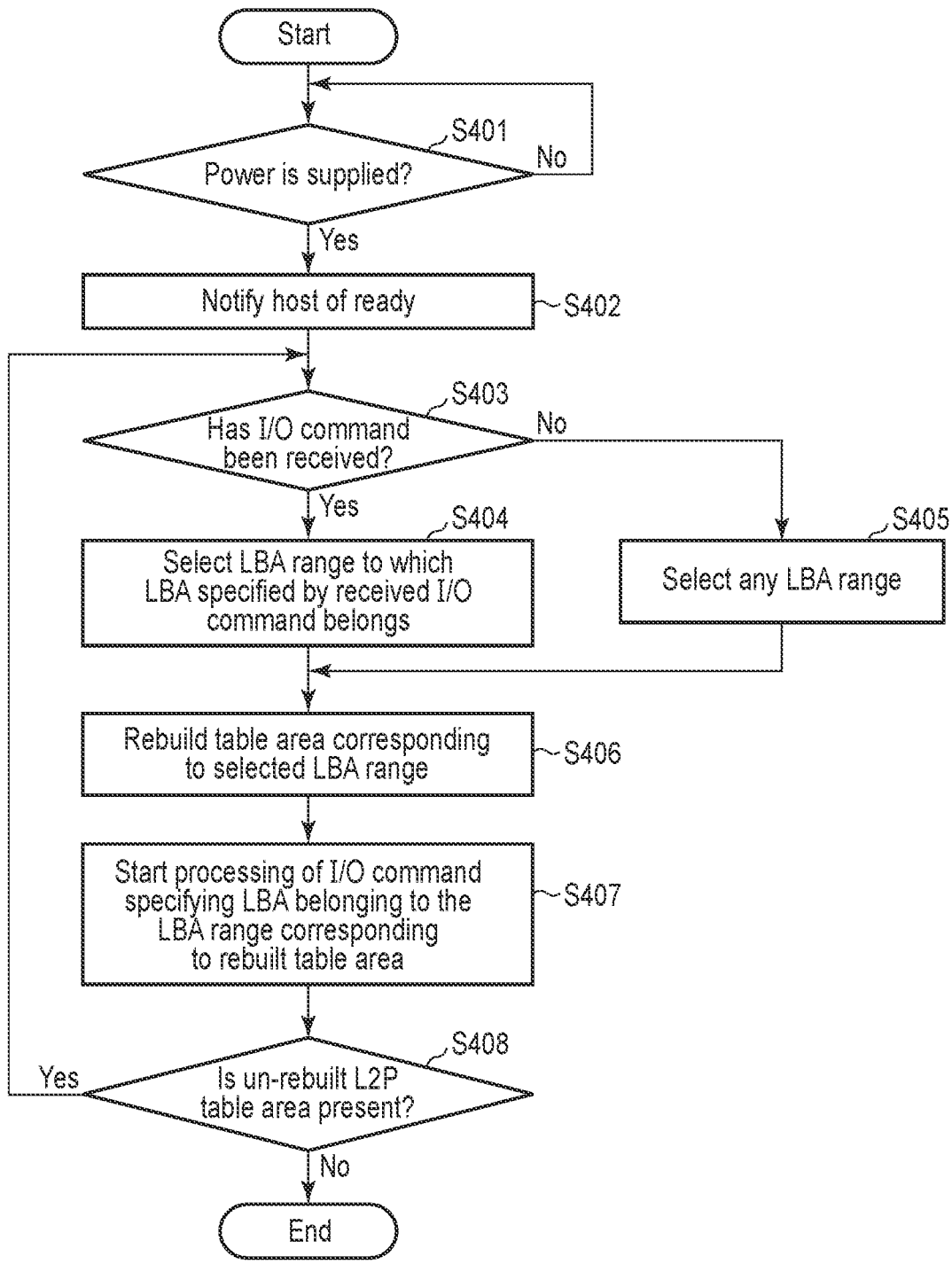
F I G. 25

MEMORY SYSTEM INCLUDING NONVOLATILE MEMORY AND METHOD OF CONTROLLING THE SAME

CROSS-REFERENCE TO RELATED APPLICATIONS

This application is based upon and claims the benefit of priority from Japanese Patent Application No. 2022-148046, filed Sep. 16, 2022, the entire contents of which are incorporated herein by reference.

FIELD

Embodiments described herein relate generally to a memory system including a nonvolatile memory and a method of controlling the memory system.

BACKGROUND

In recent years, memory systems, each including a nonvolatile memory, have been widespread. As such a memory system, a solid-state drive (SSD) including a NAND flash memory has been known.

In a memory system like an SSD, in response to that power is restored after occurrence of unexpected power loss, processing for rebuilding a logical-to-physical address translation table (L2P table) is performed. However, it takes a relatively long time to rebuild the entire L2P table. Thus, a host is likely to wait for a long time until read/write access to the memory system is allowed.

The quantity of data writable into the nonvolatile memory using the power stored in a capacitor provided in the memory system is limited. Thus, write data of which writing is incomplete to the nonvolatile memory is likely to be lost.

Therefore, in such a memory system, it is required to implement a technology capable of dealing with loss of write data and capable of reducing the time required until read/write access from a host to the memory system is made performable.

BRIEF DESCRIPTION OF THE DRAWINGS

FIG. 1 is a block diagram illustrating an exemplary configuration of an information processing system including a memory system according to an embodiment.

FIG. 5 illustrates an exemplary configuration of a superblock for use in the memory system according to the embodiment.

FIG. 8 illustrates an exemplary configuration of each of a plurality of L2P fragments stored in the L2P for use in the memory system according to the embodiment.

FIG. 17 illustrates second exemplary address-translation-information save processing in the memory system according to the embodiment.

FIG. 22 is a flowchart illustrating a procedure of address-translation-information save processing in the memory system according to the embodiment.

FIG. 24 is a flowchart illustrating a second exemplary procedure of lost-LBA-list save processing in the memory system according to the embodiment. and FIG. 25 is a flowchart illustrating a procedure of L2P table rebuild processing in the memory system according to the embodiment.

DETAILED DESCRIPTION

Figure 2:
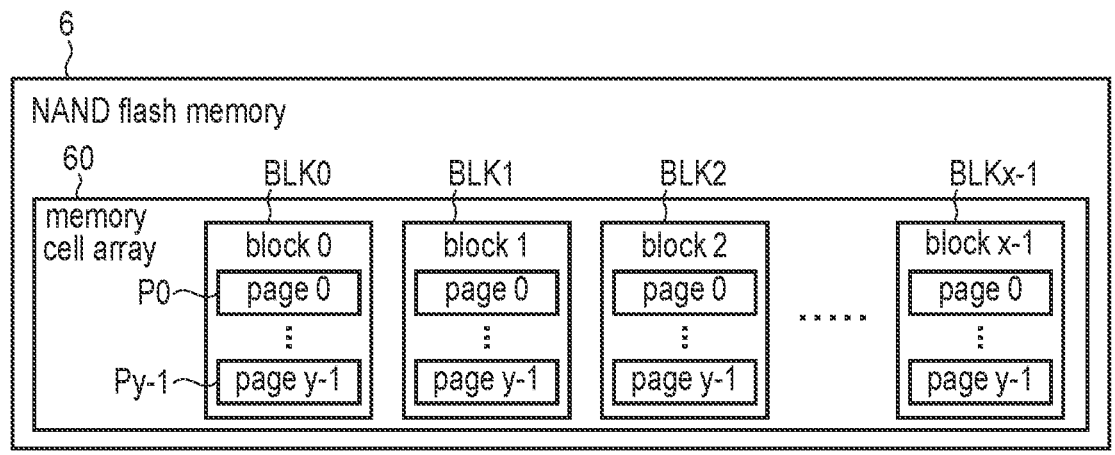
FIG. 2 is a block diagram illustrating an exemplary internal configuration of a nonvolatile memory included in the memory system according to the embodiment.

Various embodiments will be described hereinafter with reference to the accompanying drawings.

In general, according to one embodiment, a memory system connectable to a host, includes: a nonvolatile memory including a plurality of blocks; a volatile memory; and a controller configured to manage address translation information indicating a correspondence between each of logical addresses in a logical address space of the memory system and each of physical addresses of the nonvolatile memory, using a logical-to-physical address translation table stored in the volatile memory. The controller divides the logical-to-physical address translation table into a plurality of table areas including at least a first table area corresponding to a first logical address range and a second table area corresponding to a second logical address range. The controller periodically performs first processing of writing, into a first block among the plurality of blocks, address translation information on the first table area acquired from the volatile memory and an update log indicating an update content of the address translation information on the first table area updated after acquisition of the address translation information on the first table area. The controller periodically performs second processing of writing, into a second block among the plurality of blocks, address translation information on the second table area acquired from the volatile memory and an update log indicating an update content of the address translation information on the second table area updated after acquisition of the address translation information on the second table area. The controller saves, into the first block and the second block, a first list indicating a list of logical addresses corresponding to first write data lost due to unexpected power loss among write data to be written into the first logical address range and a second list indicating a list of logical addresses corresponding to second write data lost due to the unexpected power loss among write data to be written into the second logical address range, respectively. In response to restoration of power to the memory system, the controller notifies the host that the memory system is ready to process an input/output command. When an input/output command specifying a logical address belonging to one logical address range of the first logical address range and the second logical address range is received from the host, the controller selects a block corresponding to the one logical address range from the first block and the second block, and rebuilds, onto the volatile memory, based on the address translation information on the table area stored in the selected block and the update log of the address translation information, stored in the selected block, latest address translation information on the table area corresponding to the one logical address range. When a list of logical addresses corresponding to the lost write data is stored in the selected block, the controller updates, based on the list in the selected block, the rebuilt latest address translation information such that a value indicating an error is associated with each of the logical addresses corresponding to the lost write data.

First, the configuration of an information processing system including a memory system according to an embodiment will be described. FIG. 1 is a block diagram illustrating an exemplary configuration of the information processing system including a host in addition to the memory system according to the embodiment. Below, given is a case where the memory system according to the embodiment is achieved as a solid-state drive (SSD) 3.

An information processing system 1 includes a host (host device) 2 and an SSD 3. The host 2 and the SSD 3 can be connected through a bus 4.

The host 2 is an information processing apparatus that accesses the SSD 3. Examples of the information processing apparatus include a personal computer, a server computer, and other various computing devices. The host 2 transmits, to the SSD 3, a write command as a command for writing data. The host 2 transmits, to the SSD 3, a read command as a command for reading data.

The SSD 3 is a semiconductor storage device that writes data into a nonvolatile memory and reads data from the nonvolatile memory. As an exemplary nonvolatile memory, a NAND flash memory is used. Based on the write command received from the host 2, the SSD 3 performs a data write operation. Based on the read command received from the host 2, the SSD 3 performs a data read operation.

Communication between the SSD 3 and the host 2 is performed through the bus 4. The bus 4 serves as a transmission line for connecting the host 2 and the SSD 3. The bus 4 is, for example, a PCI Express™ (PCIe™) bus. The bus 4 serves as a full-duplex transmission line. The full-duplex transmission line includes a transmission line for transmitting data and an input/output (I/O) command from the host 2 to the SSD 3 and a transmission line for transmitting data and a response from the SSD 3 to the host 2. The I/O command serves as a command for writing data into the nonvolatile memory or a command for reading data from the nonvolatile memory. The I/O command is, for example, a write command or a read command.

As the standard of a logical interface for connecting the host 2 and the SSD 3, for example, Serial Attached SCSI (SAS), Serial ATA (SATA), or NVM Express™ (NVMe™) is used.

Next, the constituent elements of the host 2 will be described. The host 2 includes a processor 21 and a memory 22.

The processor 21 is a central processing unit (CPU). The processor 21 controls the operation of each component of the host 2. The processor 21 executes software (host software) loaded from the SSD 3 to the memory 22. The host 2 may include a storage device different from the SSD 3. In this case, the host software may be loaded from the storage device to the memory 22. The host software includes an operating system, a file system, a device driver, and an application program.

The memory 22 serves as a main memory provided in the host 2. The memory 22 is, for example, a volatile semiconductor memory. The memory 22 is achieved with a random access memory, such as a dynamic random access memory (DRAM).

Next, the constituent elements of the SSD 3 will be described. The SSD 3 includes a controller 5, a NAND flash memory 6, and a DRAM 7.

The controller 5 is electrically connected to the NAND flash memory 6 as a nonvolatile memory through a NAND interface 57, such as a toggle NAND flash interface or an open NAND flash interface (ONFI). The controller 5 operates as a memory controller that controls the NAND flash memory 6. The controller 5 may be achieved with a circuit, such as a system-on-a-chip (SoC).

The NAND flash memory 6 is a nonvolatile semiconductor memory. The NAND flash memory 6 may be a flash memory having a two-dimensional structure or a flash memory having a three-dimensional structure. Hereinafter, the NAND flash memory 6 is referred to as a NAND memory 6.

The DRAM 7 is a volatile semiconductor memory. For example, the DRAM 7 is used in order to temporarily store data to be written into the NAND memory 6. The storage area of the DRAM 7 is used in order to store various types of management data that the controller 5 uses.

The SSD 3 further includes a power circuit 8. The power circuit 8 is a power control circuit. For example, the power circuit 8 supplies each constituent element of the SSD 3, such as the controller 5, the NAND memory 6, and the DRAM 7, with the power supplied from the host 2. The power circuit 8 performs communication with the controller 5. For example, the power circuit 8 performs communication between the power circuit 8 and the controller 5 in order to notify the controller 5 that unexpected power loss has occurred. Next, the configuration of the controller 5 will be described in detail.

The controller 5 includes a host interface (I/F) 51, a CPU 52, an SRAM 53, a direct memory access controller (DMAC) 54, an ECC circuit 55, a DRAM interface (I/F) 56, in addition to the NAND interface (I/F) 57. The host interface 51, the CPU 52, the SRAM 53, the DMAC 54, the ECC circuit 55, the DRAM interface 56, and the NAND interface 57 are mutually connected through a bus 50.

The host interface 51 serves as a host interface circuit that performs communication with the host 2. The host interface 51 is, for example, a PCIe controller. Alternatively, in a case where the SSD 3 has a network interface controller built therein, the host interface 51 may be achieved as part of the network interface controller. The host interface 51 receives various commands from the host 2. Such commands include a write command and a read command.

The CPU 52 is a processor. The CPU 52 controls the host interface 51, the SRAM 53, the DMAC 54, the ECC circuit 55, the DRAM interface 56, and the NAND interface 57. In response to power supply to the SSD 3, the CPU 52 loads a control program (firmware) from the NAND memory 6 or a ROM (not illustrated) into the SRAM 53 and then executes the firmware to perform various types of processing. Note that the firmware may be loaded into the DRAM 7.

For example, as a flash translation layer (FTL), the CPU 52 performs management of data stored in the NAND memory 6 and management of blocks included in the NAND memory 6. The management of data stored in the NAND memory 6 includes, for example, management of address translation information. The address translation information is also referred to as mapping information or logical-to-physical address translation information. With an L2P table 71, the CPU 52 manages the address translation information. The management of blocks included in the NAND memory 6 includes management of a bad block included in the NAND memory 6, garbage collection, and wear leveling.

The controller 5 may include two or more CPUs 52.

The SRAM 53 is a volatile memory. For example, the SRAM 53 is used as a work area for the CPU 52.

Under control of the CPU 52, the DMAC 54 performs data transfer between the memory 22 of the host 2 and the DRAM 7 (or the SRAM 53). For transfer of data from the memory 22 of the host 2 to the DRAM 7 (or the SRAM 53), the CPU 52 specifies, to the DMAC 54, the source address indicating the memory area in which the data is stored in the memory 22 of the host 2, the size of the data, and the destination address indicating the memory area to which the data is to be transferred in the DRAM 7 (or the SRAM 53).

The ECC circuit 55 is a circuit that performs data encoding and data decoding. In encoding, the ECC circuit 55 gives an error correction code (ECC) as a redundant code to the data to be written into the NAND memory 6. In response to read of the data from the NAND memory 6, the ECC circuit 55 performs decoding. In decoding, with the ECC given to the data read from the NAND memory 6, the ECC circuit 55 performs error correction processing to the data.

The DRAM interface 56 is a DRAM interface circuit that controls the DRAM 7. Under control of the CPU 52, the DRAM interface 56 controls the DRAM 7.

The NAND interface 57 is a memory interface circuit that controls the NAND memory 6. Under control of the CPU 52, the NAND interface 57 controls the NAND memory 6. Communication between the NAND interface 57 and the NAND memory 6 is performed, for example, based on a toggle NAND flash interface or an open NAND flash interface (ONFI). In a case where the NAND memory 6 includes a plurality of NAND flash memory dies, for example, the NAND interface 57 is connected to the NAND flash memory dies through a plurality of channels (Ch).

Next, information that the NAND memory 6 stores will be described. The NAND memory 6 stores user data 61 and an L2P table 62.

The user data 61 is data written into the NAND memory 6 based on the write command received from the host 2.

The L2P table 62 is a table stored in the NAND memory 6 as a backup of the L2P table 71 stored in the DRAM 7. The L2P table 62 retains information necessary for rebuilding the L2P table 71. The L2P table 62 includes, for example, address translation information and the update log of the address translation information. The address translation information indicates, in units of predetermined management sizes, the correspondence between each of the logical addresses in the logical address space of the SSD 3 and each of the physical addresses of the NAND memory 6. The logical address space of the SSD 3 is an address space that the host 2 uses for access to the SSD 3. A logical address is an address logically specifying an access target storage location in the SSD 3. The logical address is specified by a command (e.g., a write command or a read command) received from the host 2. The logical address specified by a write command indicates an address in the logical address space to which the data is to be written. The logical address specified by a write command is also referred to as a starting logical address or a write destination logical address. The logical address specified by a read command indicates an address in the logical address space where read target data is stored. The logical address specified by a read command is also referred to as a starting logical address or a read target logical address. As above, the logical address specified by a command received from the host 2 corresponds to access target data (write data or read data). Thus, such a logical address is used in order to identify access target data. As an exemplary logical address, a logical block address (LBA) is used. For example, one LBA corresponds to one sector of data (e.g., 4 KiB). A physical address is an address indicating a physical storage location in the NAND memory 6. While the SSD 3 is operating, the address translation information is periodically acquired from the L2P table 71 on the DRAM 7. Then, the acquired address translation information is written into the L2P table 62 of the NAND memory 6. An update log is information indicating the update content of the address translation information on the L2P table 71 on the DRAM 7. Specifically, the update log indicates the correspondence between the logical address and the physical address updated after the address translation information is acquired from the L2P table 71. The L2P table 62 is stored in a plurality of L2P flash blocks. The L2P flash blocks are each a block allocated in order to store the L2P table 62. The L2P flash blocks are in a one-to-one correspondence with a plurality of LBA ranges acquired due to division of the logical address space of the SSD 3. The L2P table 71 on the DRAM 7 has, as divisions, a plurality of table areas (L2P areas) corresponding one-to-one to the LBA ranges. The L2P flash blocks each correspond to one table area among the table areas. The L2P flash blocks each store the address translation information on the one table area corresponding to the L2P flash block and the update log of the address translation information.

Next, information stored in the DRAM 7 will be described. The DRAM 7 includes log buffers 72-0 to 72-*n*, a data buffer 73, an LBA list 74, and an LBA-range/block management table 75, in addition to the L2P table 71.

The L2P table 71 is a table retaining the address translation information described above. Each of the table areas of the L2P table 71 retains address translation information indicating the correspondence between each of the logical addresses included in the LBA range allocated to the table area and each of physical addresses of the NAND memory 6.

The log buffers 72-0 to 72-*n* are each a buffer that retains an update log. The log buffers 72-0 to 72-*n* are in a one-to-one correspondence with the LBA ranges, namely, the table areas of the L2P table 71. The log buffers 72-0 to 72-*n* each retain the update log of the address translation information on the corresponding table area.

The data buffer 73 is a buffer that temporarily retains user data. The data buffer 73 temporarily retains data to be written into the NAND memory 6. The data buffer 73 temporarily retains data read from the NAND memory 6.

The LBA list 74 is a list that retains an LBA corresponding to data of which writing is incomplete to the NAND memory 6.

The LBA-range/block management table 75 is a table that retains information indicating the correspondence between each of the LBA ranges and each of the L2P flash blocks. For example, the LBA-range/block management table 75 retains, per LBA range, the block address of the L2P flash block allocated to the LBA range.

The SSD 3 further includes a capacitor 81. The capacitor 81 is an element capable of storing power. The capacitor 81 is electrically connected to the power circuit 8. When the value of power voltage supplied from the host 2 falls without advance notification from the host 2, the power circuit 8 supplies the power stored in the capacitor 81 to each constituent element of the SSD 3. Through the bus 50, the power circuit 8 notifies the controller 5 that such unexpected power loss has occurred. The unexpected power loss is a phenomenon of shutting down the power supply to the SSD 3 with no advance notification (power-shutdown advance notification) from the host 2. Such a power-shutdown advance notification is an advance notification that the power supply to the SSD 3 is to be shut down. Before the host 2 is powered down, the host 2 transmits a power-shutdown advance notification to the SSD 3, to notify the SSD 3 that the power supply to the SSD 3 is to be shut down shortly. For example, the power-shutdown advance notification is a command such as the Shutdown Notification defined in an NVMe standard or the STANDBY IMMEDIATE command defined in a SATA standard.

For example, the power stored in the capacitor 81 can be used by the controller 5 to perform a power loss protection (PLP) operation. In the PLP operation, the controller 5 writes, into the NAND memory 6, the information stored in a volatile memory (DRAM 7 or SRAM 53).

Next, the internal configuration of the NAND memory 6 will be described. FIG. 2 is a block diagram illustrating an exemplary internal configuration of a nonvolatile memory included in the memory system according to the embodiment.

The NAND memory 6 includes a memory cell array 60. The memory cell array 60 includes a plurality of memory cells disposed in a matrix.

The memory cell array 60 of the NAND memory 6 includes a plurality of blocks BLK0 to BLK*x*−1. The blocks BLK0 to BLK*x*−1 each include a plurality of pages (herein, pages P0 to P*y*−1). The blocks BLK0 to BLK*x*−1 each function as a unit for data deletion operation. Such a block is also referred to as a "deletion block", "physical block", or "flash block". The pages P0 to P*y*−1 are each a unit for data write operation or a unit for data read operation.

Figure 3:
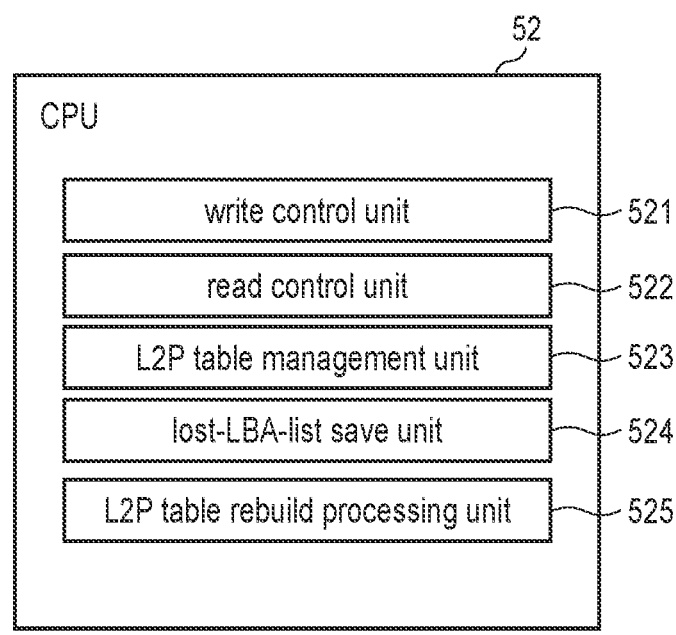
FIG. 3 is a block diagram illustrating an exemplary functional configuration of a CPU included in the memory system according to the embodiment.

Next, the functional configuration of the CPU 52 will be described. FIG. 3 is a block diagram illustrating an exemplary functional configuration of a CPU included in the memory system according to the embodiment.

The CPU 52 functions as a write control unit 521, a read control unit 522, an L2P table management unit 523, a lost-LBA-list save unit 524, and an L2P table rebuild processing unit 525. Note that the entirety or part of each function of the CPU 52 may be achieved by dedicated hardware for the controller 5.

The write control unit 521 performs processing corresponding to the write command received from the host 2. The write command specifies, for example, the starting logical address (starting LBA), the size of data, and the pointer of data. The starting LBA indicates the first logical block (write destination LBA) into which the write data associated with the write command is to be written. One logical block (sector) is a minimum unit of data that can be specified by an LBA. The size of one logical block is, for example, 512 bytes or 4K bytes. The size of data indicates the size of the write data. For example, the size of data may be expressed with the number of logical blocks (number of LBAs) to which writing is to be performed or may be expressed in bytes. The pointer of data is the memory address indicating the memory area in which the write data is stored in the memory 22. The write command may further specify the area identifier indicating any one of a plurality of areas of the NAND memory 6. Based on the write command received from the host 2, the write control unit 521 performs data acquisition processing, write destination block allocation processing, write destination determination processing, L2P update processing, completion response notification processing, and write processing.

The data acquisition processing is processing of acquiring, based on the pointer of data and the size of data, the write data from the memory 22 of the host 2. Due to acquisition of the write data from the memory 22 of the host 2, the write control unit 521 receives the write data from the host 2. The received write data is temporarily stored in the data buffer 73.

The write destination block allocation processing is processing of allocating a write destination block as the block into which the received write data is to be written. The write control unit 521 allocates a plurality of write destination blocks to a plurality of areas such that the write destination blocks are in a one-to-one correspondence with the areas. In a case where the write destination block for the area specified by the received write command has already been allocated, required is no processing of allocating a new write destination block to the area specified by the received write command.

The write destination determination processing is processing of determining the write destination for the received write data, namely, the storage location (write destination storage location) at which the write data is to be written in the NAND memory 6. The physical address indicating the write destination storage location is expressed, for example, with the block address of the write destination block into which the write data is to be written and the address indicating the storage location at which the write data is to be written in the write destination block (offset address).

The L2P update processing is processing of updating the L2P table 71 on the DRAM 7 such that the physical address of the storage location in the NAND memory 6 determined as the write destination for the write data is associated with the logical address corresponding to the write data. The L2P update processing may be performed at the point in time the write destination storage location is determined, namely, at the point in time the write data is received from the host 2. Alternatively, the L2P update processing may be performed after the received write data is actually written into the NAND memory 6.

The completion response notification processing is processing of notifying the host 2 of a completion response indicating that the processing based on the received write command has been completed. For example, the completion response notification processing may be performed at the point in time the write data is received from the host 2.

The write processing is processing of writing the write data stored in the data buffer 73 into the NAND memory 6.

The read control unit 522 performs processing corresponding to the read command received from the host 2. The read command specifies, for example, the starting logical address (starting LBA), the size of data, and the pointer of data. The starting LBA indicates the first logical block (read target LBA) in which the read target data is stored. The size of data indicates the size of the read target data. The pointer of data is the memory address indicating the memory area to which the read target data is to be transferred in the memory 22 of the host 2. The read command may further specify the area identifier indicating the area in which the read target data is stored. Based on the read command received from the host 2, the read control unit 522 performs address resolution processing, read processing, data transfer processing, and completion response notification processing.

The address resolution processing is processing of acquiring, with reference to the L2P table 71 on the DRAM 7, the physical address associated with the LBA (starting LBA) corresponding to the read target data. The read processing is processing of reading, based on the acquired physical address, the read target data from the NAND memory 6. The read target data is temporarily stored in the data buffer 73. The data transfer processing is processing of transferring the read target data stored in the data buffer 73 to the memory area in the memory 22 indicated by the pointer of data. The completion response notification processing is processing of notifying the host 2 of a completion response indicating that the processing based on the read command has been completed.

The L2P table management unit 523 manages the L2P table 71. The L2P table management unit 523 divides the L2P table 71 into a plurality of table areas corresponding one-to-one to a plurality of logical address ranges. The L2P table management unit 523 performs, per logical address range, namely, per table area, update-log management processing and address-translation-information/update-log save processing.

The update-log management processing is processing of managing, per table area, the update log of the address translation information, with the log buffers 72-0 to 72-n in a one-to-one correspondence with the table areas. For example, in response to an update in the correspondence between a logical address belonging to a logical address range and the physical address, in the table area, corresponding to the logical address range, in the L2P table 71, the L2P table management unit 523 stores, into the log buffer corresponding to the table area, the update log of the address translation information corresponding to the logical address. The update log is information indicating the correspondence updated between the logical address and the physical address. For example, in a case where the physical address (PBA) associated with LBA 10 is updated from the physical address (PBA)=5 to the physical address (PBA)=10, the L2P table management unit 523 stores, into the log buffer, an update log indicating that new PBA 10 is associated with LBA 10.

The address-translation-information/update-log save processing is processing of periodically writing, per table area in the L2P table 71, the address translation information on the table area and the update log corresponding to the table area into the block (L2P flash block) in the NAND memory 6. For example, in the address-translation-information/update-log save processing regarding a first table area corresponding to a logical address range, the L2P table management unit 523 periodically performs processing of writing, into the L2P flash block corresponding to the first table area, the address translation information on the first table area acquired from the L2P table 71 of the DRAM 7 and an update log indicating the update content of the address translation information updated after acquisition of the address translation information on the first table area. In the address-translation-information/update-log save processing regarding a second table area corresponding to another logical address range, the L2P table management unit 523 periodically performs processing of writing, into the L2P flash block corresponding to the second table area, the address translation information on the second table area acquired from the L2P table 71 of the DRAM 7 and an update log indicating the update content of the address translation information updated after acquisition of the address translation information on the second table area. As above, the address-translation-information/update-log save processing is periodically performed per table area in the L2P table 71, so that, into each L2P flash block, on a time-series basis, stored is a plurality of address translation information/update log pairs each including a combination of the address translation information on the table area corresponding to the L2P flash block and an update log indicating the update content of the address translation information. That is, into each L2P flash block, on a time-series basis, stored is a plurality of address translation information/update log pairs in a format including the address translation information and an update log indicating the update content of the address translation information, new address translation information due to the update log and an update log indicating the update content of the new address translation information, and so on.

Note that each table area may include some pieces of address translation information from a plurality of pieces of address translation information included in the entire L2P table 71. Each of the plurality of pieces of address translation information is a set of a plurality of physical addresses associated one-to-one with a plurality of consecutive logical addresses. For example, the first table area may include at least first address translation information and second address translation information among the plurality of pieces of address translation information included in the entire L2P table 71. Similarly, the second table area may include at least third address translation information and fourth address translation information among the pieces of address translation information included in the entire L2P table 71.

In such a case, in the address-translation-information/update-log save processing regarding the first table area, the L2P table management unit 523 repeatedly performs (1) processing of acquiring the first address translation information from the DRAM 7, (2) processing of writing, into the L2P flash block corresponding to the first table area, the acquired first address translation information and a first update log indicating the update content regarding all address translation information on the first table area updated after acquisition of the first address translation information, (3) processing of acquiring the second address translation information from the DRAM 7, and (4) processing of writing, into the L2P flash block corresponding to the first table area, the acquired second address translation information and a second update log indicating the update content regarding all address translation information on the first table area updated after acquisition of the second address translation information. As a result, into the L2P flash block corresponding to the first table area, stored are the first address translation information, the first update log, the second address translation information, the second update log, new first address translation information due to the contents of the first update log and the second update log, a new first update log, new second address translation information due to the contents of the second update log and the new first update log, a new second update log, and so on.

Similarly, in the address-translation-information/update-log save processing regarding the second table area, the L2P table management unit 523 repeatedly performs (1) processing of acquiring the third address translation information from the DRAM 7, (2) processing of writing, into the L2P flash block corresponding to the second table area, the acquired third address translation information and a third update log indicating the update content regarding all address translation information on the second table area updated after acquisition of the third address translation information, (3) processing of acquiring the fourth address translation information from the DRAM 7, and (4) processing of writing, into the L2P flash block corresponding to the second table area, the acquired fourth address translation information and a fourth update log indicating the update content regarding all address translation information on the second table area updated after acquisition of the fourth address translation information. As a result, into the L2P flash block corresponding to the second table area, stored are the third address translation information, the third update log, the fourth address translation information, the fourth update log, new third address translation information due to the contents of the third update log and the fourth update log, a new third update log, new fourth address translation information due to the contents of the fourth update log and the new third update log, a new fourth update log, and so on.

In response to occurrence of unexpected power loss, the L2P table management unit 523 determines whether or not an unsaved update log which is not yet saved into the L2P flash block is present in any of the log buffers 72-0 to 72-n. In a case where, in the log buffer corresponding to a table area, an unsaved update log which is not yet saved into the L2P flash block corresponding to this table area is present, the L2P table management unit 523 writes the unsaved update log into the L2P flash block, using the power stored in the capacitor 81. That is, the update log stored in the log buffer 72 is included in PLP target data.

For example, the L2P table management unit 523 manages an update log indicating the update content of the address translation information on the first table area and an update log indicating the update content of the address translation information on the second table area with the log buffer 72-0 and the log buffer 72-1, respectively. In response to occurrence of unexpected power loss, the L2P table management unit 523 writes, in a case where an unsaved update log which is not yet saved into the L2P flash block corresponding to the first table area is present in the log buffer 72-0, the unsaved update log in the log buffer 72-0 into the L2P flash block corresponding to the first table area, using the power stored in the capacitor 81. In a case where an unsaved update log which is not yet saved into the L2P flash block corresponding to the second table area is present in the log buffer 72-1, the L2P table management unit 523 writes the unsaved update log in the log buffer 72-1 into the L2P flash block corresponding to the second table area, using the power stored in the capacitor 81.

The lost-LBA-list save unit 524 performs lost-LBA-list save processing per table area in the L2P table 71. The lost-LBA-list save processing is processing of saving a logical address list corresponding to write data lost due to unexpected power loss. For example, in the lost-LBA-list save processing regarding the first table area, the lost-LBA-list save unit 524 saves, into the L2P flash block corresponding to the first table area, the logical address list (first list) corresponding to the write data lost due to unexpected power loss in the write data to be written into the logical address range corresponding to the first table area. For example, in the lost-LBA-list save processing regarding the second table area, the lost-LBA-list save unit 524 saves, into the L2P flash block corresponding to the second table area, the logical address list (second list) corresponding to the write data lost due to unexpected power loss in the write data to be written into the logical address range corresponding to the second table area.

The first list is a set of the logical addresses left due to removal of a set of the logical addresses each corresponding to the write data of which writing is complete to the NAND memory 6 from a set of the logical addresses each corresponding to the write data that has been received from the host 2 and is to be written into a first logical address range.

The second list is a set of the logical addresses left due to removal of a set of the logical addresses each corresponding to the write data of which writing is complete to the NAND memory 6 from a set of the logical addresses each corresponding to the write data that has been received from the host 2 and is to be written into a second logical address range.

The first list and the second list are generated based on the LBA list 74 stored in the DRAM 7. The LBA list 74 is a set of the logical addresses corresponding to all data that has been received from the host 2 and of which writing is incomplete to the NAND memory 6.

The lost-LBA-list save processing is performed with a first method or a second method.

According to the first method, in response to occurrence of unexpected power loss, the lost-LBA-list save unit 524 writes, using the power stored in the capacitor 81, the first list and the second list into the L2P flash block corresponding to the first table area and the L2P flash block corresponding to the second table area, respectively. As above, according to the first method, at the time of occurrence of unexpected power loss, the first list and the second list are saved into the L2P flash block corresponding to the first table area and the L2P flash block corresponding to the second table area, respectively.

According to the second method, in response to occurrence of unexpected power loss, the lost-LBA-list save unit 524 writes, using the power stored in the capacitor 81, the first list and the second list into a predetermined single block in the NAND memory 6. For example, the predetermined single block may be a single level cell block (SLC block). The SLC block is a block into which data is written in an SLC mode as a program mode in which 1 bit of data is written per memory cell. Note that each L2P flash block may be an SLC block, a triple level cell block (TLC block), or a quad level cell block (QLC block). The TLC block is a block into which data is written in a TLC mode as a program mode in which 3 bits of data are written per memory cell. The QLC block is a block into which data is written in a QLC mode as a program mode in which 4 bits of data are written per memory cell. Then, in response to restoration of power to the SSD 3, the lost-LBA-list save unit 524 copies the first list and the second list from the predetermined single block into the L2P flash block corresponding to the first table area and the L2P flash block corresponding to the second table area, respectively. As above, according to the second method, at the time of occurrence of unexpected power loss, the first list and the second list are not distributed to the L2P flash block corresponding to the first table area and the L2P flash block corresponding to the second table area, respectively, but, at the time when power to the SSD 3 is restored, the first list and the second list are distributed to the L2P flash block corresponding to the first table area and the L2P flash block corresponding to the second table area, respectively.

The L2P table rebuild processing unit 525 performs L2P table rebuild processing per table area in the L2P table 71. The L2P table rebuild processing is processing of rebuilding, based on the address translation information and the update log stored in each L2P flash block, the latest address translation information on each table area in the L2P table 71 onto the DRAM 7.

In response to restoration of power to the SSD 3, before performing the L2P table rebuild processing, the L2P table rebuild processing unit 525 notifies the host 2 that the SSD 3 is ready to process an input/output command. In response to reception of an input/output command specifying a logical address belonging to a logical address range from the host 2, the L2P table rebuild processing unit 525 selects, from the L2P flash blocks, the L2P flash block corresponding to the logical address range. Then, based on the address translation information on the table area and the update log stored in the selected L2P flash block, the L2P table rebuild processing unit 525 rebuilds, onto the DRAM 7, the latest address translation information on the table area corresponding to the logical address range. In a case where power to the SSD 3 is restored after occurrence of unexpected power loss, the latest address translation information to be rebuilt is the address translation information on the table area in the L2P table 71 just before occurrence of unexpected power loss.

For example, in processing of rebuilding the address translation information on the first table area, based on the latest address translation information in the address translation information stored in the L2P flash block corresponding to the first table area and the latest update log among the update logs stored in the L2P flash block, the L2P table rebuild processing unit 525 can rebuild the latest address translation information on the first table area. That is, the L2P table rebuild processing unit 525 copies the latest address translation information stored in the L2P flash block corresponding to the first table area to the DRAM 7 and reflects the content of the latest update log stored in the L2P flash block to the address translation information (the latest address translation information) copied to the DRAM 7.

For example, in processing of rebuilding the address translation information on the second table area, based on the latest address translation information in the address translation information stored in the L2P flash block corresponding to the second table area and the latest update log among the update logs stored in the L2P flash block, the L2P table rebuild processing unit 525 can rebuild the latest address translation information on the second table area. That is, the L2P table rebuild processing unit 525 copies the latest address translation information stored in the L2P flash block corresponding to the second table area to the DRAM 7 and reflects the content of the latest update log stored in the L2P flash block to the address translation information (the latest address translation information) copied to the DRAM 7.

In a case where the address translation information on the first table area includes the first address translation information and the second address translation information, processing of rebuilding the address translation information on the first table area is performed as follows.

The L2P table rebuild processing unit 525 copies, to the DRAM 7, the latest second address translation information in the second address translation information stored in the L2P flash block corresponding to the first table area and the latest first address translation information in the first address translation information stored in the L2P flash block. Then, the L2P table rebuild processing unit 525 reflects the content of the latest first update log among the first update logs stored in the L2P flash block only to the first address translation information copied to the DRAM 7. The latest first update log includes an update log regarding all the address translation information on the first table area. However, because the latest second address translation information is written from the L2P table 71 into the L2P flash block after the latest first update log is written into the L2P flash block, the content of the latest first update log has already been reflected to the latest second address translation information. Thus, required is no processing of reflecting the content of the latest first update log to the second address translation information copied to the DRAM 7. Therefore, the content of the latest first update log is reflected only to the first address translation information copied to the DRAM 7.

Then, the L2P table rebuild processing unit 525 reflects the content of the latest second update log among the second update logs stored in the L2P flash block to both of the first address translation information copied to the DRAM 7 and the second address translation information copied to the DRAM 7. The reason for the reflection to both of the first address translation information and the second address translation information is because the latest second update log is the latest update log regarding all the address translation information on the first table area.

In a case where the address translation information on the second table area includes the third address translation information and the fourth address translation information, processing of rebuilding the address translation information on the second table area is performed as follows.

The L2P table rebuild processing unit 525 copies, to the DRAM 7, the latest fourth address translation information in the fourth address translation information stored in the L2P flash block corresponding to the second table area and the latest third address translation information in the third address translation information stored in the L2P flash block. Then, the L2P table rebuild processing unit 525 reflects the content of the latest third update log among the third update logs stored in the L2P flash block only to the third address translation information copied to the DRAM 7. Then, the L2P table rebuild processing unit 525 reflects the content of the latest fourth update log among the fourth update logs stored in the L2P flash block to both of the third address translation information copied to the DRAM 7 and the fourth address translation information copied to the DRAM 7.

After that, the L2P table rebuild processing unit 525 determines whether or not the logical address list corresponding to the lost write data is stored in the selected L2P flash block. In a case where the logical address list corresponding to the lost write data is stored in the selected L2P flash block, based on the list stored in the selected L2P flash block, the L2P table rebuild processing unit 525 updates the rebuilt latest address translation information on the L2P table 71 such that a value indicating an error is associated with each of the logical addresses corresponding to the lost write data.

As above, the address translation information on the table area corresponding to the selected block is rebuilt and furthermore the logical addresses corresponding to the lost write data are each associated with a value indicating an error.

The rebuilt address translation information is the address translation information corresponding to the logical address range to which the logical address specified by the I/O command from the host 2 belongs. Therefore, the address translation information required to be referred to or updated for processing based on the I/O command can be rebuilt with priority over the address translation information on the other logical address ranges. Therefore, a reduction can be made in the time required until read/write access from the host 2 to the SSD 3 is actually made performable after restoration of power to the SSD 3.

Even in a case where the read command specifying a logical address corresponding to the lost write data is received from the host 2, the controller 5 can notify the host 2 of an error. Therefore, a fault can be prevented, such as wrong return of data, different from the data corresponding to the logical address specified by the read command, to the host 2.

Figure 4:
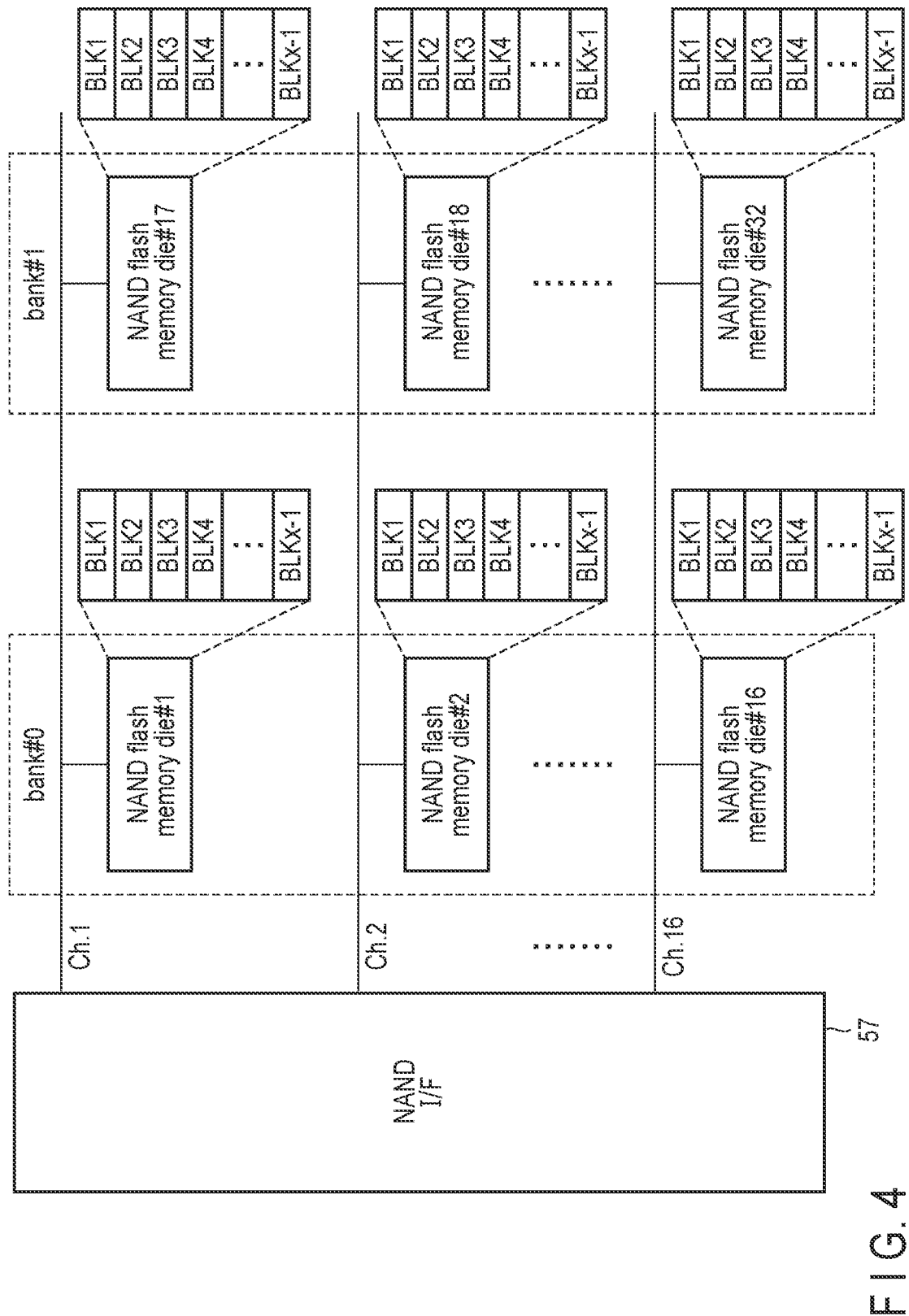
FIG. 4 illustrates an exemplary relationship between a plurality of channels and a plurality of NAND flash memory dies for use in the memory system according to the embodiment.

Next, the configuration of the NAND memory 6 including a plurality of NAND flash memory dies will be described. FIG. 4 is a block diagram illustrating an exemplary relationship between a plurality of channels and the NAND flash memory dies for use in the memory system according to the embodiment.

The NAND flash memory dies are each capable of operating independently. Thus, the NAND flash memory dies are each treated as a unit capable of parallel operation. FIG. 4 exemplifies a case where the NAND interface (I/F) 57 has 16 channels Ch.1 to Ch.16 connected thereto and the 16 channels Ch.1 to Ch.16 each have two NAND flash memory dies connected thereto.

In this case, 16 NAND flash memory dies #1 to #16 connected, respectively, to the channels Ch.1 to Ch.16 may be provided as a bank #0, and the remaining 16 NAND flash memory dies #17 to #32 connected, respectively, to the channels Ch.1 to Ch.16 may be provided as a bank #1. The banks are each treated as a unit for bringing the memory dies into parallel operation by bank interleaving. In the exemplary configuration of FIG. 4, the 16 channels and bank interleaving with the two banks enable the 32 NAND flash memory dies to be brought into parallel operation at the maximum.

A data deletion operation may be performed per single block (physical block) or may be performed per block group, in which each block group includes a set of a plurality of physical blocks capable of parallel operation. Such a block group is also referred to as a superblock.

One block group, namely, one superblock including a set of a plurality of physical blocks may include, but is not limited to, 32 physical blocks selected one-to-one from the NAND flash memory dies #1 to #32, in total. Note that the NAND flash memory dies #1 to #32 each have a multiplane configuration. For example, in a case where the NAND flash memory dies #1 to #32 each have a multiplane configuration including two planes, one superblock may include 64 physical blocks selected one-to-one from 64 planes corresponding to the NAND flash memory dies #1 to #32, in total.

FIG. 5 exemplifies one superblock (SB) including 32 physical blocks (herein, the physical block BLK2 in the NAND flash memory die #1, the physical block BLK3 in the NAND flash memory die #2, the physical block BLK7 in the NAND flash memory die #3, the physical block BLK4 in the NAND flash memory die #4, the physical block BLK6 in the NAND flash memory die #5, . . . , and the physical block BLK3 in the NAND flash memory die #32).

Note that a configuration in which one superblock includes only one physical block may be used. In this case, one superblock is equivalent to one physical block.

The superblock includes logical pages identical in number to pages (physical pages) P0 to Py−1 included in each of the physical blocks included in the superblock. The logical pages are each also referred to as a superpage. One superpage includes 32 physical pages identical in number to the physical blocks included in the superblock. For example, the head superpage of the illustrated superblock includes a set of the physical pages P0 of the respective physical blocks BLK2, BLK3, BLK7, BLK4, BLK6, . . . , and BLK3 of the NAND flash memory dies #1, #2, #3, #4, #5, . . . , and #32.

Figure 6:
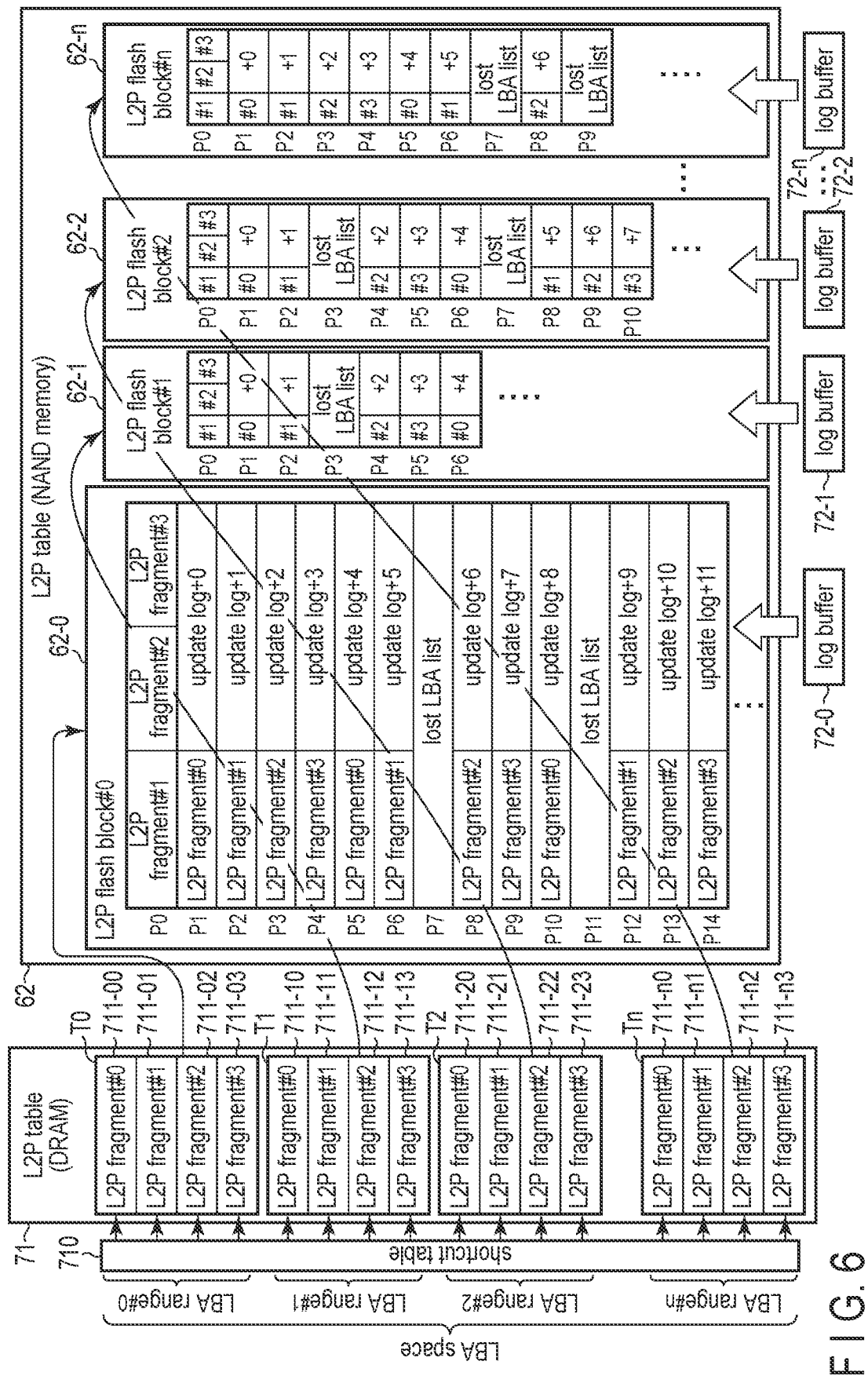
FIG. 6 illustrates an exemplary configuration of an L2P table for use in the memory system according to the embodiment and an exemplary relationship between a plurality of table areas of the L2P table and a plurality of L2P flash blocks.

Next, the configuration of the L2P table 71 will be described. FIG. 6 illustrates an exemplary configuration of the L2P table 71 for use in the memory system according to the embodiment and an exemplary relationship between a plurality of table areas of the L2P table 71 and a plurality of L2P flash blocks.

Herein, given is a case where the logical address space of the SSD 3 has, as divisions, (n+1) number of LBA ranges. The logical address space includes an LBA range #0, an LBA range #1, an LBA range #2, . . . , and an LBA range #n.

A shortcut table 710 is a table retaining the relationship between an LBA and a memory address indicating the storage location at which an L2P fragment in the L2P table 71 is stored.

The L2P table 71 of the DRAM 7 includes a plurality of L2P fragments. The L2P fragments are each address translation information. The L2P fragments can each include a plurality of physical addresses corresponding one-to-one to a plurality of consecutive logical addresses. For example, one L2P fragment may include a predetermined number of physical addresses corresponding one-to-one to a predetermined number of consecutive logical addresses.

The L2P table 71 has, as divisions, a table area T0 corresponding to the LBA range #0, a table area T1 corresponding to the LBA range #1, a table area T2 corresponding to the LBA range #2, . . . , and a table area Tn corresponding to the LBA range #n. The table areas T0 to Tn each include one or a plurality of L2P fragments. FIG. 6 exemplifies a case where each table area includes four L2P fragments (L2P fragments #0 to #3).

The L2P table 71 includes an L2P fragment 711-00, an L2P fragment 711-01, an L2P fragment 711-02, and an L2P fragment 711-03 as a set of L2P fragments corresponding to the LBA range #0. The L2P fragment 711-00 is the address translation information corresponding to the first small LBA range among four small LBA ranges acquired due to division of the LBA range #0. The L2P fragment 711-01 is the address translation information corresponding to the second small LBA range among the four small LBA ranges. The L2P fragment 711-02 is the address translation information corresponding to the third small LBA range among the four small LBA ranges. The L2P fragment 711-03 is the address translation information corresponding to the last small LBA range among the four small LBA ranges.

The L2P table 71 includes an L2P fragment 711-10, an L2P fragment 711-11, an L2P fragment 711-12, and an L2P fragment 711-13 as a set of L2P fragments corresponding to the LBA range #1.

The L2P table 71 includes an L2P fragment 711-20, an L2P fragment 711-21, an L2P fragment 711-22, and an L2P fragment 711-23 as a set of L2P fragments corresponding to the LBA range #2.

The L2P table 71 includes an L2P fragment 711-$n$0, an L2P fragment 711-$n$1, an L2P fragment 711-$n$2, and an L2P fragment 711-$n$3 as a set of L2P fragments corresponding to the LBA range #n.

The shortcut table 710 includes pointers of which the number is identical to the total number of L2P fragments included in the L2P table 71. The pointers each indicate the memory address of the memory area in which the L2P fragment corresponding to the pointer is stored in the DRAM 7.

The L2P table 62 of the NAND memory 6 retains information for use in backup of the address translation information on each table area of the L2P table 71. The L2P table 62 is stored in (n+1) number of L2P flash blocks in a one-to-one correspondence with the LBA ranges #0 to #n (namely, the table areas T0 to Tn). An L2P flash block 62-0 is a block corresponding to the LBA range #0. An L2P flash block 62-1 is a block corresponding to the LBA range #1. An L2P flash block 62-2 is a block corresponding to the LBA range #2. An L2P flash block 62-$n$ is a block corresponding to the LBA range #n.

Next, the address-translation-information/update-log save processing regarding the table area T0 will be described. In response to allocation of the L2P flash block 62-0 to the table area T0, for example, the controller 5 writes, into the page P0 of the L2P flash block 62-0, the L2P fragment (#1) 711-01, the L2P fragment (#2) 711-02, and the L2P fragment (#3) 711-03.

After that, the controller 5 acquires the L2P fragment (#0) 711-00 from the table area T0. Then, the controller 5 waits until the amount of update log accumulated in the log buffer 72-0 corresponding to the LBA range #0 reaches the threshold. When the amount of update log accumulated in the log buffer 72-0 corresponding to the LBA range #0 reaches the threshold, the controller 5 writes, into the page P1 of the L2P flash block 62-0, the acquired L2P fragment (#0) 711-00 and the update log (update log +0) stored in the log buffer 72-0. When the update log (update log +0) stored in the log buffer 72-0 is written into the page P1, the log buffer 72-0 is empty, including no unsaved update log. The L2P fragment (#0) 711-00 has already been acquired from the table area T0 before the update log accumulated in the log buffer 72-0 is written into the page P1. Thus, the update log +0 indicates the update content regarding all the L2P fragments (#0) 711-00 to (#3) 711-03 updated after acquisition of the L2P fragment (#0) 711-00. For example, in a case where the physical address associated with LBA i among a predetermined number of LBAs corresponding to the L2P fragment (#0) 711-00 is updated from PBA 10 to PBA 20 and the physical address associated with LBA j among a predetermined number of logical addresses corresponding to the L2P fragment (#1) 711-01 is updated from PBA 30 to PBA 40, the update log +0 includes update information indicating that PBA 20 is associated with LBA i and update information indicating that PBA 40 is associated with LBA j.

When writing the L2P fragment (#0) 711-00 and the update log +0 into the page P1 of the L2P flash block 62-0, the controller 5 acquires the L2P fragment (#1) 711-01 from the table area T0. Then, the controller 5 waits until the amount of update log anew accumulated in the log buffer 72-0 corresponding to the LBA range #0 reaches the threshold. When the amount of update log anew accumulated in the log buffer 72-0 corresponding to the LBA range #0 reaches the threshold, the controller 5 writes, into the page P2 of the L2P flash block 62-0, the acquired L2P fragment (#1) 711-01 and the update log (update log +1) stored in the log buffer 72-0. The L2P fragment (#1) 711-01 has already been acquired from the table area T0 before the update log accumulated in the log buffer 72-0 is written into the page P2. Thus, the update log +1 indicates the update content regarding all the L2P fragments of the table area T0 updated after acquisition of the L2P fragment (#1) 711-01.

When writing the L2P fragment (#1) 711-01 and the update log +1 into the page P2 of the L2P flash block 62-0, the controller 5 acquires the L2P fragment (#2) 711-02 from the table area T0. Then, the controller 5 waits until the amount of update log anew accumulated in the log buffer 72-0 corresponding to the LBA range #0 reaches the threshold. When the amount of update log anew accumulated in the log buffer 72-0 corresponding to the LBA range #0 reaches the threshold, the controller 5 writes, into the page P3 of the L2P flash block 62-0, the acquired L2P fragment (#2) 711-02 and the update log (update log +2) stored in the log buffer 72-0. The L2P fragment (#2) 711-02 has already been acquired from the table area T0 before the update log accumulated in the log buffer 72-0 is written into the page P3. Thus, the update log +2 indicates the update content regarding all the L2P fragments of the table area T0 updated after acquisition of the L2P fragment (#2) 711-02.

When writing the L2P fragment (#2) 711-02 and the update log +2 into the page P3 of the L2P flash block 62-0, the controller 5 acquires the L2P fragment (#3) 711-03 from the table area T0. Then, the controller 5 waits until the amount of update log anew accumulated in the log buffer 72-0 corresponding to the LBA range #0 reaches the threshold. When the amount of update log anew accumulated in the log buffer 72-0 corresponding to the LBA range #0 reaches the threshold, the controller 5 writes, into the page P4 of the L2P flash block 62-0, the acquired L2P fragment (#3) 711-03 and the update log (update log +3) stored in the log buffer 72-0. The L2P fragment (#3) 711-03 has already been acquired from the table area T0 before the update log accumulated in the log buffer 72-0 is written into the page P4. Thus, the update log +3 indicates the update content regarding all the L2P fragments of the table area T0 updated after acquisition of the L2P fragment (#3) 711-03.

When writing the L2P fragment (#3) 711-03 and the update log +3 into the page P4 of the L2P flash block 62-0, the controller 5 acquires the L2P fragment (#0) 711-00 from the table area T0. Then, the controller 5 waits until the amount of update log anew accumulated in the log buffer 72-0 corresponding to the LBA range #0 reaches the threshold. When the amount of update log anew accumulated in the log buffer 72-0 corresponding to the LBA range #0 reaches the threshold, the controller 5 writes, into the page P5 of the L2P flash block 62-0, the acquired L2P fragment (#0) 711-00 and the update log (update log +4) stored in the log buffer 72-0. The L2P fragment (#0) 711-00 has already been acquired from the table area T0 before the update log accumulated in the log buffer 72-0 is written into the page P5. Thus, the update log +4 indicates the update content regarding all the L2P fragments of the table area T0 updated after acquisition of the L2P fragment (#0) 711-00.

When writing the L2P fragment (#0) 711-00 and the update log +4 into the page P5 of the L2P flash block 62-0, the controller 5 acquires the L2P fragment (#1) 711-01 from the table area T0. Then, the controller 5 waits until the amount of update log anew accumulated in the log buffer 72-0 corresponding to the LBA range #0 reaches the threshold. Here, given is a case where first-time unexpected power loss occurs.

The controller 5 determines whether or not a new unsaved update log to the L2P flash block 62-0 is stored in the log buffer 72-0. In a case where a new unsaved update log to the L2P flash block 62-0 is stored in the log buffer 72-0, the controller 5 writes, into the page P6 of the L2P flash block 62-0, the acquired L2P fragment (#1) 711-01 and the update log (update log +5) stored in the log buffer 72-0. Then, the controller 5 writes, into the page P7 of the L2P flash block 62-0, a lost LBA list corresponding to the LBA range #0. The lost LBA list corresponding to the LBA range #0 is an LBA list corresponding to the write data lost due to unexpected power loss in the write data to be written into the LBA range #0.

As above, in accordance with the amount of update log accumulated in the log buffer 72-0, the controller 5 writes, into the L2P flash block 62-0, the L2P fragment and the update log. In response to occurrence of unexpected power loss, regardless of the amount of update log accumulated in the log buffer 72-0, the controller 5 writes the update log and the L2P fragment into the L2P flash block 62-0. Thus, the update log accumulated in the log buffer 72-0 can be prevented from being lost. Furthermore, in response to occurrence of unexpected power loss, the controller 5 writes the lost LBA list into the L2P flash block 62-0. Thus, the controller 5 can record, in the L2P flash block 62-0, each LBA of the write data lost due to unexpected power loss in the write data to be written into the LBA range #0, with incomplete writing to the NAND memory 6.

After the SSD 3 starts operating again due to restoration of power to the SSD 3, the controller 5 acquires the L2P fragment (#2) 711-02 from the table area T0. Then, the controller 5 waits until the amount of update log anew accumulated in the log buffer 72-0 corresponding to the LBA range #0 reaches the threshold. When the amount of update log anew accumulated in the log buffer 72-0 corresponding to the LBA range #0 reaches the threshold, the controller 5 writes, into the page P8 of the L2P flash block 62-0, the acquired L2P fragment (#2) 711-02 and the update log (update log +6) stored in the log buffer 72-0.

When writing the L2P fragment (#2) 711-02 and the update log +6 into the page P8 of the L2P flash block 62-0, the controller 5 acquires the L2P fragment (#3) 711-03 from the table area T0. Then, the controller 5 waits until the amount of update log anew accumulated in the log buffer 72-0 corresponding to the LBA range #0 reaches the threshold. When the amount of update log anew accumulated in the log buffer 72-0 corresponding to the LBA range #0 reaches the threshold, the controller 5 writes, into the page P9 of the L2P flash block 62-0, the acquired L2P fragment (#3) 711-03 and the update log (update log +7) stored in the log buffer 72-0.

When writing the L2P fragment (#3) 711-03 and the update log +7 into the page P9 of the L2P flash block 62-0, the controller 5 acquires the L2P fragment (#0) 711-00 from the table area T0. Then, the controller 5 waits until the amount of update log anew accumulated in the log buffer 72-0 corresponding to the LBA range #0 reaches the threshold. Here, given is a case where second-time unexpected power loss occurs.

The controller 5 determines whether or not a new unsaved update log to the L2P flash block 62-0 is stored in the log buffer 72-0. In a case where a new unsaved update log to the L2P flash block 62-0 is stored in the log buffer 72-0, the controller 5 writes, into the page P10 of the L2P flash block 62-0, the acquired L2P fragment (#0) 711-00 and the update log (update log +8) stored in the log buffer 72-0. Then, the controller 5 writes, into the page P11 of the L2P flash block 62-0, a lost LBA list corresponding to the LBA range #0.

After the SSD 3 starts operating again due to restoration of power to the SSD 3, the controller 5 acquires the L2P fragment (#1) 711-01 from the table area T0. Then, the controller 5 waits until the amount of update log anew accumulated in the log buffer 72-0 corresponding to the LBA range #0 reaches the threshold. When the amount of update log anew accumulated in the log buffer 72-0 corresponding to the LBA range #0 reaches the threshold, the controller 5 writes, into the page P12 of the L2P flash block 62-0, the acquired L2P fragment (#1) 711-01 and the update log (update log +9) stored in the log buffer 72-0.

Then, similarly to the operation described above, the controller 5 writes the L2P fragment (#2) 711-02 and the update log (update log +10) into the page P13 of the L2P flash block 62-0. Then, the controller 5 writes the L2P fragment (#3) 711-03 and the update log (update log +11) into the page P14 of the L2P flash block 62-0.

Next, the address-translation-information/update-log save processing regarding the table areas T1 to Tn in parallel with the address-translation-information/update-log save processing regarding the table area T0 will be described.

First, the address-translation-information/update-log save processing regarding the table area T1 will be described. In response to allocation of the L2P flash block 62-1 to the table area T1, the controller 5 writes, into the page P0 of the L2P flash block 62-1, the L2P fragment (#1) 711-11, the L2P fragment (#2) 711-12, and the L2P fragment (#3) 711-13.

After that, the controller 5 acquires the L2P fragment (#0) 711-10 from the table area T1. Then, the controller 5 waits until the amount of update log accumulated in the log buffer 72-1 corresponding to the LBA range #1 reaches the threshold. When the amount of update log accumulated in the log buffer 72-1 corresponding to the LBA range #1 reaches the threshold, the controller 5 writes, into the page P1 of the L2P flash block 62-1, the acquired L2P fragment (#0) 711-10 and the update log (update log +0) stored in the log buffer 72-1.

When writing the L2P fragment (#0) 711-10 and the update log +0 into the page P1 of the L2P flash block 62-1, the controller 5 acquires the L2P fragment (#1) 711-11 from the table area T1. The controller 5 waits until the amount of update log accumulated in the log buffer 72-1 corresponding to the LBA range #1 reaches the threshold. When the amount of update log accumulated in the log buffer 72-1 reaches the threshold, the controller 5 writes, into the page P2 of the L2P flash block 62-1, the acquired L2P fragment (#1) 711-11 and the update log (update log +1) stored in the log buffer 72-1. In a case where the amount of update of the address translation information on the table area T1 is less than the amount of update of the address translation information on the table area T0, the number of L2P fragment/update log pairs to be written into the L2P flash block 62-1 is less than the number of L2P fragment/update log pairs to be written into the L2P flash block 62-0.

In response to occurrence of first-time unexpected power loss after the L2P fragment (#1) 711-11 and the update log +1 are written into the page P2 of the L2P flash block 62-1, while new unsaved update log which is not yet saved into the L2P flash block 62-1 is not stored in the log buffer 72-1 at the time of occurrence of the first-time unexpected power loss, the controller 5 writes a lost LBA list corresponding to the LBA range #1 into the page P3 of the L2P flash block 62-1.

After the SSD 3 starts operating again due to restoration of power to the SSD 3, the controller 5 acquires the L2P fragment (#2) 711-12 from the table area T1. Then, the controller 5 waits until the amount of update log anew accumulated in the log buffer 72-1 corresponding to the LBA range #1 reaches the threshold. When the amount of update log anew accumulated in the log buffer 72-1 corresponding to the LBA range #1 reaches the threshold, the controller 5 writes, into the page P4 of the L2P flash block 62-1, the acquired L2P fragment (#2) 711-12 and the update log (update log +2) stored in the log buffer 72-1.

Then, similarly to the above operation, the controller 5 writes the L2P fragment (#3) 711-13 and the update log +3 into the page P5 of the L2P flash block 62-1. Then, the controller 5 writes the L2P fragment (#0) 711-10 and the update log +4 into the page P6 of the L2P flash block 62-1.

Here, in response to occurrence of second-time unexpected power loss, the controller 5 writes a lost LBA list corresponding to the LBA range #1 into the page P7 of the L2P flash block 62-1. Note that, in a case where writing of all write data to be written into the LBA range #1 is complete, no lost LBA list corresponding to the LBA range #1 is present. No processing of writing a lost LBA list into the page P7 of the L2P flash block 62-1 is performed.

Next, the address-translation-information/update-log save processing regarding the table area T2 will be described. In response to allocation of the L2P flash block 62-2 to the table area T2, the controller 5 writes, into the page P0 of the L2P flash block 62-2, the L2P fragment (#1) 711-21, the L2P fragment (#2) 711-22, and the L2P fragment (#3) 711-23.

After that, the controller 5 acquires the L2P fragment (#0) 711-20 from the table area T2. Then, the controller 5 waits until the amount of update log accumulated in the log buffer 72-2 corresponding to the LBA range #2 reaches the threshold. When the amount of update log accumulated in the log buffer 72-2 corresponding to the LBA range #2 reaches the threshold, the controller 5 writes, into the page P1 of the L2P flash block 62-2, the acquired L2P fragment (#0) 711-20 and the update log (update log +0) stored in the log buffer 72-2.

When writing the L2P fragment (#0) 711-20 and the update log +0 into the page P1 of the L2P flash block 62-2, the controller 5 acquires the L2P fragment (#1) 711-21 from the table area T2. The controller 5 waits until the amount of update log accumulated in the log buffer 72-2 corresponding to the LBA range #2 reaches the threshold. When the amount of update log accumulated in the log buffer 72-2 reaches the threshold, the controller 5 writes, into the page P2 of the L2P flash block 62-2, the acquired L2P fragment (#1) 711-21 and the update log (update log +1) stored in the log buffer 72-2.

In response to occurrence of first-time unexpected power loss after the L2P fragment (#1) 711-21 and the update log +1 are written into the page P2 of the L2P flash block 62-2, while unsaved update log which is not yet saved into the L2P flash block 62-2 is not stored in the log buffer 72-2 at the time of occurrence of the first-time unexpected power loss, the controller 5 writes a lost LBA list corresponding to the LBA range #2 into the page P3 of the L2P flash block 62-2.

After the SSD 3 starts operating again due to restoration of power to the SSD 3, the controller 5 acquires the L2P fragment (#2) 711-22 from the table area T2. Then, the controller 5 waits until the amount of update log anew accumulated in the log buffer 72-2 corresponding to the LBA range #2 reaches the threshold. When the amount of update log anew accumulated in the log buffer 72-2 corresponding to the LBA range #2 reaches the threshold, the controller 5 writes, into the page P4 of the L2P flash block 62-2, the acquired L2P fragment (#2) 711-22 and the update log (update log +2) stored in the log buffer 72-2.

Then, similarly to the above operation, the controller 5 writes the L2P fragment (#3) 711-23 and the update log +3 into the page P5 of the L2P flash block 62-2. Then, the controller 5 writes the L2P fragment (#0) 711-20 and the update log +4 into the page P6 of the L2P flash block 62-2.

In response to occurrence of second-time unexpected power loss after the L2P fragment (#0) 711-20 and the update log +4 are written into the page P6 of the L2P flash block 62-2, while unsaved update log which is not yet saved into the L2P flash block 62-2 is not stored in the log buffer 72-2 at the time of occurrence of the second-time unexpected power loss, the controller 5 writes a lost LBA list corresponding to the LBA range #2 into the page P7 of the L2P flash block 62-2.

After the SSD 3 starts operating again due to restoration of power to the SSD 3, similarly to the above operation, the controller 5 writes the L2P fragment (#1) 711-21 and the update log +5 into the page P8 of the L2P flash block 62-2. Then, the controller 5 writes the L2P fragment (#2) 711-22 and the update log +6 into the page P9 of the L2P flash block 62-2. Then, the controller 5 writes the L2P fragment (#3) 711-23 and the update log +7 into the page P10 of the L2P flash block 62-2.

Next, the address-translation-information/update-log save processing regarding the table area Tn will be described. In response to allocation of the L2P flash block 62-*n* to the table area Tn, for example, the controller 5 writes, into the page P0 of the L2P flash block 62-*n*, the L2P fragment (#1) 711-*n*1, the L2P fragment (#2) 711-*n*2, and the L2P fragment (#3) 711-*n*3.

After that, in accordance with a procedure similar to the procedure of the address-translation-information/update-log save processing regarding the table areas T0 to T2, the controller 5 performs processing of writing the L2P fragment (#0) 711-*n*0 and the update log +0 into the page P1 of the L2P flash block 62-*n*, processing of writing the L2P fragment (#1) 711-*n*1 and the update log +1 into the page P2 of the L2P flash block 62-*n*, processing of writing the L2P fragment (#2) 711-*n*2 and the update log +2 into the page P3 of the L2P flash block 62-*n*, processing of writing the L2P fragment (#3) 711-*n*3 and the update log +3 into the page P4 of the L2P flash block 62-*n*, processing of writing the L2P fragment (#0) 711-*n*0 and the update log +4 into the page P5 of the L2P flash block 62-*n*, and processing of writing the L2P fragment (#1) 711-*n*1 and the update log +5 into the page P6 of the L2P flash block 62-*n*.

In response to occurrence of first-time unexpected power loss after the L2P fragment (#1) 711-*n*1 and the update log +5 are written into the page P6 of the L2P flash block 62-*n*, while unsaved update log which is not yet saved into the L2P flash block 62-*n* is not stored in the log buffer 72-*n* at the time of occurrence of the first-time unexpected power loss, the controller 5 writes a lost LBA list corresponding to the LBA range #n into the page P7 of the L2P flash block 62-*n*.

After the SSD 3 starts operating again due to restoration of power to the SSD 3, the controller 5 writes the L2P fragment (#2) 711-*n*2 and the update log +6 into the page P8 of the L2P flash block 62-*n*.

In response to occurrence of second-time unexpected power loss after the L2P fragment (#2) 711-*n*2 and the update log +6 are written into the page P8 of the L2P flash block 62-*n*, while unsaved update log which is not yet saved into the L2P flash block 62-*n* is not stored in the log buffer 72-*n* at the time of occurrence of the second-time unexpected power loss, the controller 5 writes a lost LBA list corresponding to the LBA range #n into the page P9 of the L2P flash block 62-*n*.

Figure 7:
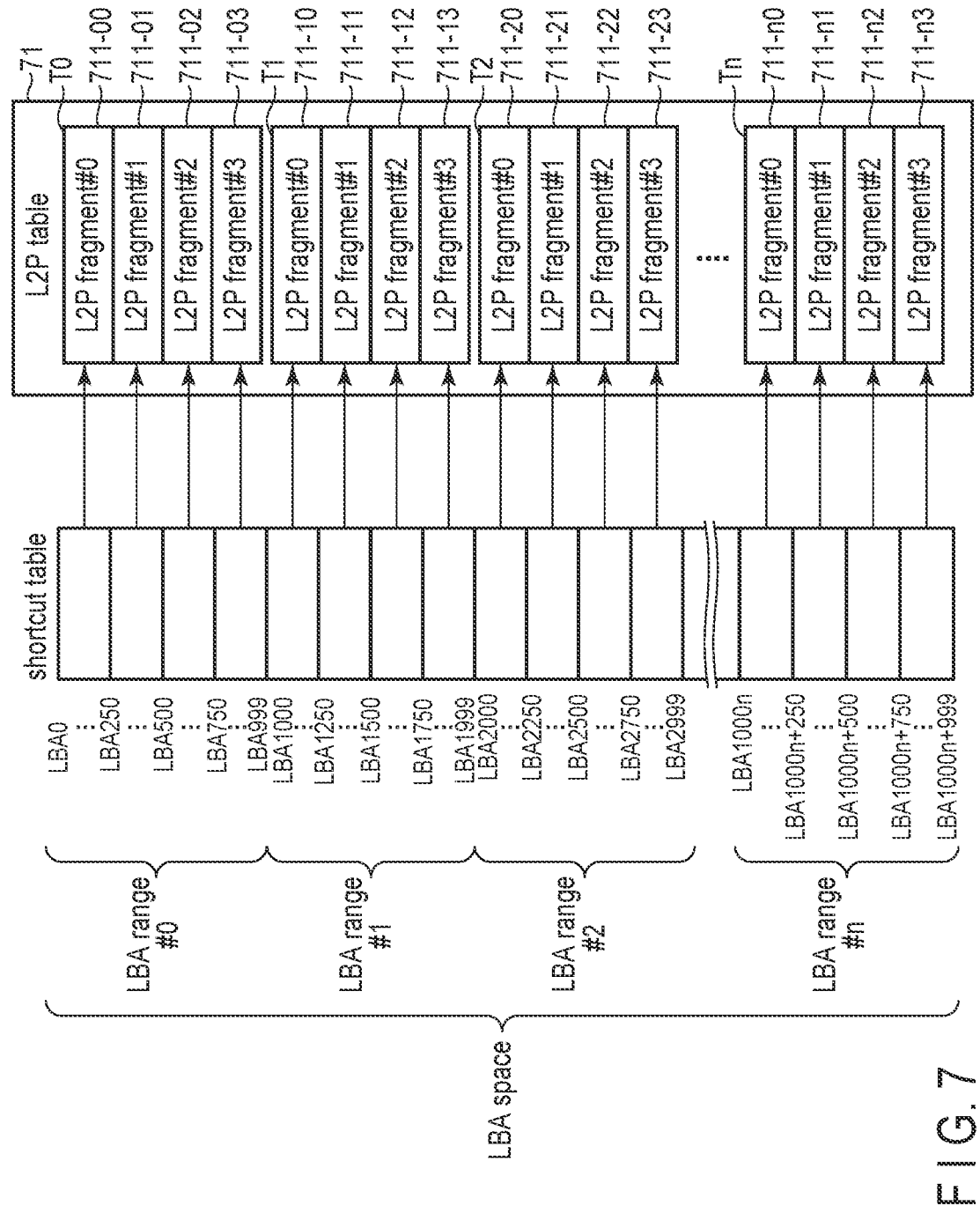
FIG. 7 illustrates an exemplary relationship between a plurality of LBA ranges and the table areas of the L2P tables in the memory system according to the embodiment.

Next, a plurality of LBA ranges acquired due to division of the LBA space of the SSD 3 will be described. FIG. 7 illustrates an exemplary relationship between a plurality of LBA ranges and a plurality of table areas of the L2P table 71 in the memory system according to the embodiment.

Here, the LBA space of the SSD 3 includes 10000×(n+1) number of LBAs ranging from LBA 0 to LBA (1000n+999). The LBA space is divided into (n+1) number of LBA ranges. Each LBA range includes LBAs of which the number is identical to those of the others. One LBA range includes, for example, 1000 consecutive LBAs.

The LBA range #0 includes 1000 LBAs ranging from LBA 0 to LBA 999. The LBA range #1 includes 1000 LBAs ranging from LBA 1000 to LBA 1999. The LBA range #2 includes 1000 LBAs ranging from LBA 2000 to LBA 2999. The LBA range #n includes 1000 LBAs ranging from LBA 1000n to LBA (1000n+999).

The L2P table 71 includes a plurality of L2P fragments 711-00 to 711-*n*3. The L2P fragments 711-00 to 711-*n*3 each include, as address translation information, for example, information indicating 250 physical addresses corresponding one-to-one to 250 consecutive LBAs.

The L2P fragment 711-00 includes information indicating 250 physical addresses corresponding one-to-one to 250 LBAs ranging from LBA 0 to LBA 249 included in the LBA range #0. The memory address indicating the storage area in which the L2P fragment 711-00 is stored in the DRAM 7 is stored in the entry corresponding to the LBAs ranging from LBA 0 to LBA 249 in the shortcut table 710.

The L2P fragment 711-01 includes information indicating 250 physical addresses corresponding one-to-one to 250 LBAs ranging from LBA 250 to LBA 499 included in the LBA range #0. The memory address indicating the storage area in which the L2P fragment 711-01 is stored in the DRAM 7 is stored in the entry corresponding to the LBAs ranging from LBA 250 to LBA 499 in the shortcut table 710.

The L2P fragment 711-02 includes information indicating 250 physical addresses corresponding one-to-one to 250 LBAs ranging from LBA 500 to LBA 749 included in the LBA range #0. The memory address indicating the storage area in which the L2P fragment 711-02 is stored in the DRAM 7 is stored in the entry corresponding to the LBAs ranging from LBA 500 to LBA 749 in the shortcut table 710.

The L2P fragment 711-03 includes information indicating 250 physical addresses corresponding one-to-one to 250 LBAs ranging from LBA 750 to LBA 999 included in the LBA range #0. The memory address indicating the storage area in which the L2P fragment 711-03 is stored in the DRAM 7 is stored in the entry corresponding to the LBAs ranging from LBA 750 to LBA 999 in the shortcut table 710.

The L2P fragment 711-10 includes information indicating 250 physical addresses corresponding one-to-one to 250 LBAs ranging from LBA 1000 to LBA 1249 included in the LBA range #1. The memory address indicating the storage area in which the L2P fragment 711-10 is stored in the DRAM 7 is stored in the entry corresponding to the LBAs ranging from LBA 1000 to LBA 1249 in the shortcut table 710.

The L2P fragment 711-11 includes information indicating 250 physical addresses corresponding one-to-one to 250 LBAs ranging from LBA 1250 to LBA 1499 included in the LBA range #1. The memory address indicating the storage area in which the L2P fragment 711-11 is stored in the DRAM 7 is stored in the entry corresponding to the LBAs ranging from LBA 1250 to LBA 1499 in the shortcut table 710.

The L2P fragment 711-12 includes information indicating 250 physical addresses corresponding one-to-one to 250 LBAs ranging from LBA 1500 to LBA 1749 included in the LBA range #1. The memory address indicating the storage area in which the L2P fragment 711-12 is stored in the DRAM 7 is stored in the entry corresponding to the LBAs ranging from LBA 1500 to LBA 1749 in the shortcut table 710.

The L2P fragment 711-13 includes information indicating 250 physical addresses corresponding one-to-one to 250 LBAs ranging from LBA 1750 to LBA 1999 included in the LBA range #1. The memory address indicating the storage area in which the L2P fragment 711-13 is stored in the DRAM 7 is stored in the entry corresponding to the LBAs ranging from LBA 1750 to LBA 1999 in the shortcut table 710.

The L2P fragment 711-20 includes information indicating 250 physical addresses corresponding one-to-one to 250 LBAs ranging from LBA 2000 to LBA 2249 included in the LBA range #2. The memory address indicating the storage area in which the L2P fragment 711-20 is stored in the DRAM 7 is stored in the entry corresponding to the LBAs ranging from LBA 2000 to LBA 2249 in the shortcut table 710.

The L2P fragment 711-21 includes information indicating 250 physical addresses corresponding one-to-one to 250 LBAs ranging from LBA 2250 to LBA 2499 included in the LBA range #2. The memory address indicating the storage area in which the L2P fragment 711-21 is stored in the DRAM 7 is stored in the entry corresponding to the LBAs ranging from LBA 2250 to LBA 2499 in the shortcut table 710.

The L2P fragment 711-22 includes information indicating 250 physical addresses corresponding one-to-one to 250 LBAs ranging from LBA 2500 to LBA 2749 included in the LBA range #2. The memory address indicating the storage area in which the L2P fragment 711-22 is stored in the DRAM 7 is stored in the entry corresponding to the LBAs ranging from LBA 2500 to LBA 2749 in the shortcut table 710.

The L2P fragment 711-23 includes information indicating 250 physical addresses corresponding one-to-one to 250 LBAs ranging from LBA 2750 to LBA 2999 included in the LBA range #2. The memory address indicating the storage area in which the L2P fragment 711-23 is stored in the DRAM 7 is stored in the entry corresponding to the LBAs ranging from LBA 2750 to LBA 2999 in the shortcut table 710.

The L2P fragment 711-*n*0 includes information indicating 250 physical addresses corresponding one-to-one to 250 LBAs ranging from LBA 1000n to LBA (1000n+249) included in the LBA range #n. The memory address indicating the storage area in which the L2P fragment 711-*n*0 is stored in the DRAM 7 is stored in the entry corresponding to the LBAs ranging from LBA 1000n to LBA (1000n+249) in the shortcut table 710.

The L2P fragment 711-*n*1 includes information indicating 250 physical addresses corresponding one-to-one to 250 LBAs ranging from LBA (1000n+250) to LBA (1000n+449) included in the LBA range #n. The memory address indicating the storage area in which the L2P fragment 711-*n*1 is stored in the DRAM 7 is stored in the entry corresponding to the LBAs ranging from LBA (1000n+250) to LBA (1000n+499) in the shortcut table 710.

The L2P fragment 711-*n*2 includes information indicating 250 physical addresses corresponding one-to-one to 250 LBAs ranging from LBA (1000n+500) to LBA (1000n+749) included in the LBA range #n. The memory address indicating the storage area in which the L2P fragment 711-*n*2 is stored in the DRAM 7 is stored in the entry corresponding to the LBAs ranging from LBA (1000n+500) to LBA (1000n+749) in the shortcut table 710.

The L2P fragment 711-*n*3 includes information indicating 250 physical addresses corresponding one-to-one to 250 LBAs ranging from LBA (1000n+750) to LBA (1000n+999) included in the LBA range #n. The memory address indicating the storage area in which the L2P fragment 711-*n*3 is stored in the DRAM 7 is stored in the entry corresponding to the LBAs ranging from LBA (1000n+750) to LBA (1000n+999) in the shortcut table 710.

Next, an L2P fragment will be described. FIG. 8 illustrates an exemplary L2P fragment for use in the memory system according to the embodiment. The exemplary L2P fragment in FIG. 8 is the L2P fragment 711-00.

The L2P fragment 711-00 includes information indicating 250 physical addresses corresponding one-to-one to 250 LBAs ranging from LBA 0 to LBA 249.

The first entry of the L2P fragment 711-00 retains information indicating PBA 10 as the physical address corresponding to LBA 0. The second entry of the L2P fragment 711-00 retains information indicating PBA 11 as the physical address corresponding to LBA 1. The third entry of the L2P fragment 711-00 retains information indicating PBA 20 as the physical address corresponding to LBA 2. The fourth entry of the L2P fragment 711-00 retains information indicating PBA 50 as the physical address corresponding to LBA 3. The fifth entry of the L2P fragment 711-00 retains information indicating PBA 30 as the physical address corresponding to LBA 4. Similarly, the 250-th entry of the L2P fragment 711-00 retains information indicating PBA 300 as the physical address corresponding to LBA 249. Note that, into the entry associated with an LBA corresponding to lost data, stored is a value indicating that an error (uncorrectable data error) has occurred, instead of a PBA.

Figure 9:
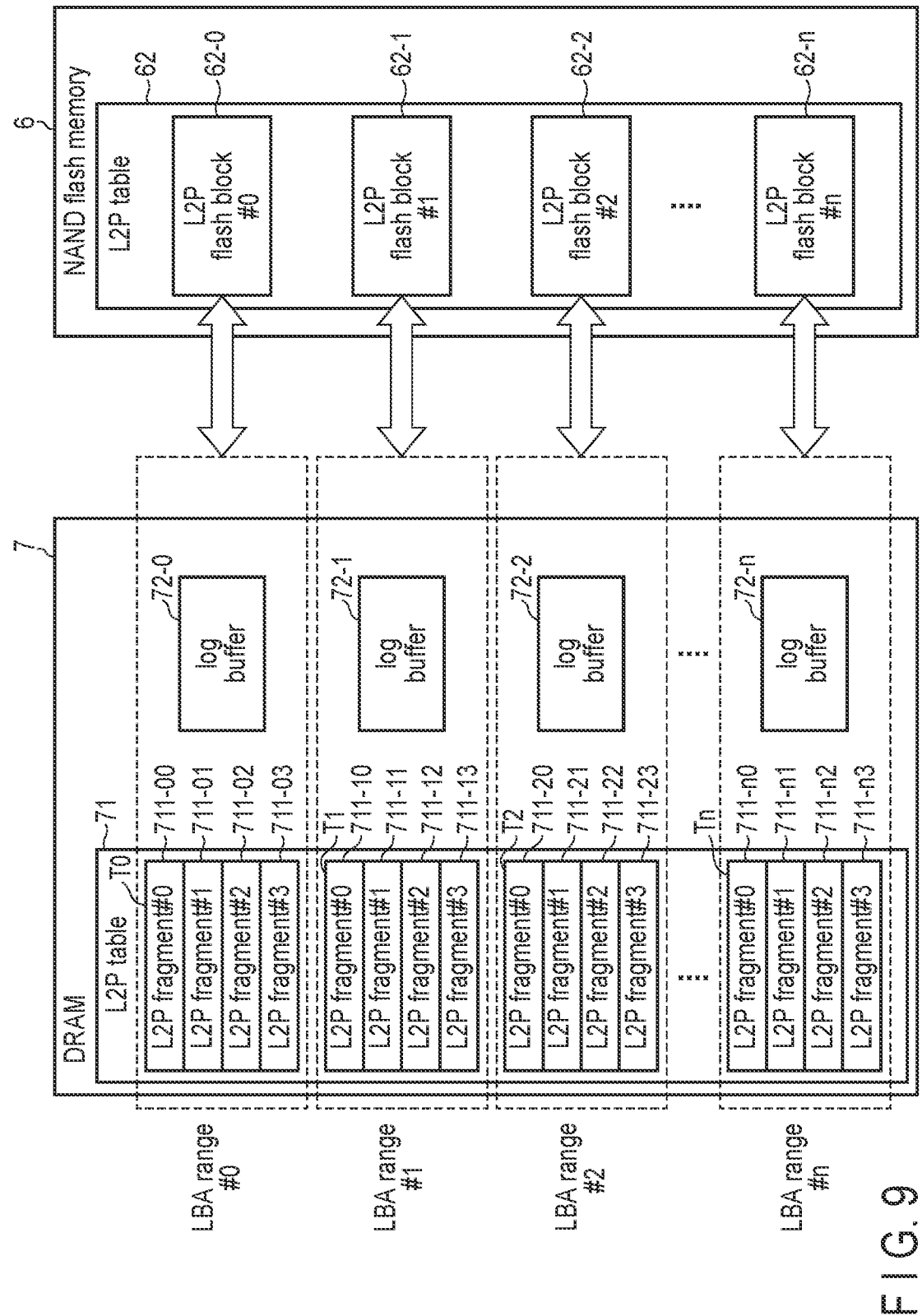
FIG. 9 illustrates an exemplary relationship between the LBA ranges, the table areas of the L2P table, a plurality of log buffers, and the L2P flash blocks in the memory system according to the embodiment.

Next, the relationship between a table area, a log buffer, and an L2P table will be described. FIG. 9 illustrates an exemplary relationship between a plurality of LBA ranges, a plurality of table areas of the L2P table 71, a plurality of log buffers, and a plurality of L2P flash blocks in the memory system according to the embodiment.

The log buffer 72-0 and the L2P flash block 62-0 of the L2P table 62 correspond to the table area T0 (L2P fragments 711-00 to 711-03) of the L2P table 71 corresponding to the LBA range #0.

The log buffer 72-1 and the L2P flash block 62-1 of the L2P table 62 correspond to the table area T1 (L2P fragments 711-10 to 711-13) of the L2P table 71 corresponding to the LBA range #1.

The log buffer 72-2 and the L2P flash block 62-2 of the L2P table 62 correspond to the table area T2 (L2P fragments 711-20 to 711-23) of the L2P table 71 corresponding to the LBA range #2.

The log buffer 72-*n* and the L2P flash block 62-*n* of the L2P table 62 correspond to the table area Tn (L2P fragments 711-*n*0 to 711-*n*3) of the L2P table 71 corresponding to the LBA range #n.

In response to update of the address translation information regarding an LBA included in the LBA range #0, the controller 5 stores an update log regarding the update into the log buffer 72-0. When the amount of update log accumulated in the log buffer 72-0 reaches the threshold, the controller 5 writes, into the L2P flash block 62-0, one L2P fragment among the L2P fragment 711-00, the L2P fragment 711-01, the L2P fragment 711-02, and the L2P fragment 711-03 in the L2P table 71, and the update log accumulated in the log buffer 72-0. When the L2P flash block 62-0 becomes full, the controller 5 selects a new flash block in the NAND memory 6 and allocates the selected flash block to the L2P flash block corresponding to the LBA range #0. Then, the controller 5 writes, into the new L2P flash block, the next L2P fragment and the update log. Then, when a pair of the L2P fragment 711-00 and the update log, a pair of the L2P fragment 711-01 and the update log, a pair of the L2P fragment 711-02 and the update log, and a pair of the L2P fragment 711-03 and the update log are assembled in the new L2P flash block, the controller 5 cancels the allocation of the original L2P flash block 62-0 to the LBA range #0. This is because the information stored in the new L2P flash block 62-0 is sufficient to enable rebuilding of the L2P fragment 711-00, the L2P fragment 711-01, the L2P fragment 711-02, and the L2P fragment 711-03 of the table area T0 in the L2P table 71.

In response to update of the address translation information regarding an LBA included in the LBA range #1, the controller 5 stores an update log regarding the update into the log buffer 72-1. When the amount of update log accumulated in the log buffer 72-1 reaches the threshold, the controller 5 writes, into the L2P flash block 62-1, one L2P fragment among the L2P fragment 711-10, the L2P fragment 711-11, the L2P fragment 711-12, and the L2P fragment 711-13 in the L2P table 71, and the update log accumulated in the log buffer 72-1. When the L2P flash block 62-1 becomes full, the controller 5 selects a new flash block in the NAND memory 6 and allocates the selected flash block to the L2P flash block corresponding to the LBA range #1. Then, the controller 5 writes, into the new L2P flash block, the next L2P fragment and the update log. Then, when a pair of the L2P fragment 711-10 and the update log, a pair of the L2P fragment 711-11 and the update log, a pair of the L2P fragment 711-12 and the update log, and a pair of the L2P fragment 711-13 and the update log are assembled in the new L2P flash block, the controller 5 cancels the allocation of the original L2P flash block 62-1 to the LBA range #1.

In response to update of the address translation information regarding an LBA included in the LBA range #2, the controller 5 stores an update log regarding the update into the log buffer 72-2. When the amount of update log accumulated in the log buffer 72-2 reaches the threshold, the controller 5 writes, into the L2P flash block 62-2, one L2P fragment among the L2P fragment 711-20, the L2P fragment 711-21, the L2P fragment 711-22, and the L2P fragment 711-23 in the L2P table 71, and the update log accumulated in the log buffer 72-2. When the L2P flash block 62-2 becomes full, the controller 5 selects a new flash block in the NAND memory 6 and allocates the selected flash block to the L2P flash block corresponding to the LBA range #2. Then, the controller 5 writes, into the new L2P flash block, the next L2P fragment and the update log. Then, when a pair of the L2P fragment 711-20 and the update log, a pair of the L2P fragment 711-21 and the update log, a pair of the L2P fragment 711-22 and the update log, and a pair of the L2P fragment 711-23 and the update log are assembled in the new L2P flash block, the controller 5 cancels the allocation of the original L2P flash block 62-2 to the LBA range #2.

Furthermore, in response to update of the address translation information regarding an LBA included in the LBA range #n, the controller 5 stores an update log regarding the update into the log buffer 72-n. When the amount of update log accumulated in the log buffer 72-n reaches the threshold, the controller 5 writes, into the L2P flash block 62-n, one L2P fragment among the L2P fragment 711-n0, the L2P fragment 711-n1, the L2P fragment 711-n2, and the L2P fragment 711-n3 in the L2P table 71, and the update log accumulated in the log buffer 72-n. When the L2P flash block 62-n becomes full, the controller 5 selects a new flash block in the NAND memory 6 and allocates the selected flash block to the L2P flash block corresponding to the LBA range #n. Then, the controller 5 writes, into the new L2P flash block, the next L2P fragment and the update log. Then, when a pair of the L2P fragment 711-n0 and the update log, a pair of the L2P fragment 711-n1 and the update log, a pair of the L2P fragment 711-n2 and the update log, and a pair of the L2P fragment 711-n3 and the update log are assembled in the new L2P flash block, the controller 5 cancels the allocation of the original L2P flash block 62-n to the LBA range #n.

Figure 10:
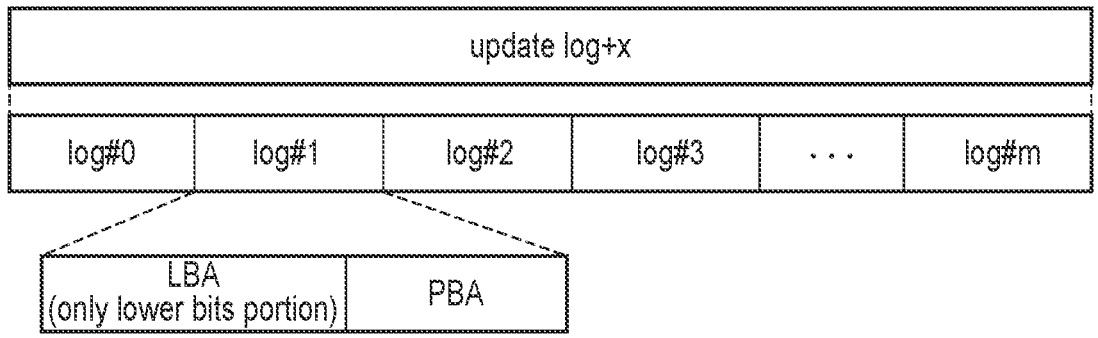
FIG. 10 illustrates a first exemplary update log in the memory system according to the embodiment.

Next, a first exemplary update log will be described. FIG. 10 illustrates the first exemplary update log in the memory system according to the embodiment.

An update log +x in FIG. 10 includes, for example, (m+1) number of logs (logs #0 to #m). Below, given is a case where the update log +x is an update log to be written into the L2P flash block 62-0 corresponding to the LBA range #0.

The logs #0 to #m each include, per data to be written into the LBA range #0, the LBA corresponding to the data and the physical address PBA indicating the storage location in the NAND memory 6 determined as the write destination for the data.

For example, the LBA included in the log #1 indicates the logical address of data to be written into the LBA range #0. The LBA included in the log #1 has only low-order bits in the bit length necessary for an individual LBA. The respective LBAs that the logs #0 to #m include belong to the LBA range #0. Thus, required are no high-order bits specifying the LBA range #0.

The PBA included in the log #1 indicates the physical address anew mapped to the LBA included in the log #1. That is, the PBA included in the log #1 is the physical address indicating the storage location in the NAND memory 6 determined as the write destination for the data corresponding to the LBA included in the log #1.

Figure 11:
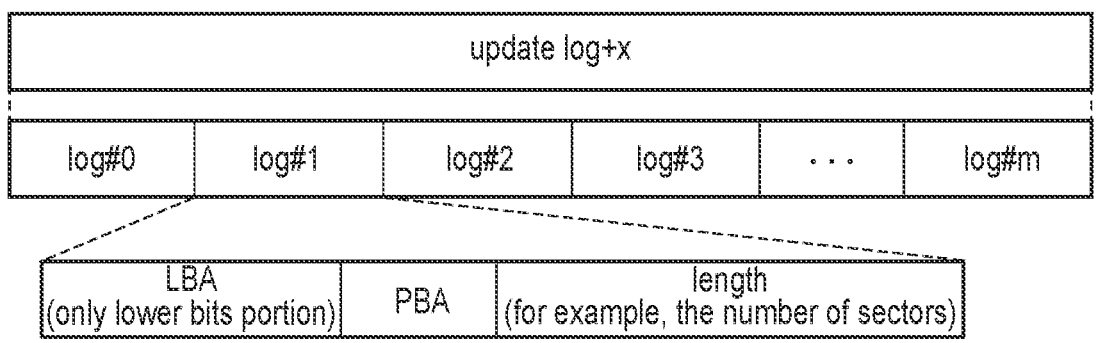
FIG. 11 illustrates a second exemplary update log in the memory system according to the embodiment.

Next, a second exemplary update log will be described. FIG. 11 illustrates the second exemplary update log in the memory system according to the embodiment.

An update log +x in FIG. 11 is an update log to be written into the L2P flash block 62-0 corresponding to the LBA range #0.

Logs #0 to #m each include, per data to be written into the LBA range #0, the LBA corresponding to the data, the physical address PBA indicating the storage location in the NAND memory 6 determined as the write destination for the data, and information indicating the length of the data (size of the data). The length (size of the data) is expressed, for example, with the number of sectors. In a case where data of which the size is equivalent to a plurality of sectors is relatively frequently written into the NAND memory 6, use of the format of the update log +x in FIG. 11 enables more address translation information corresponding to an LBA to be retained in one update log +x, in comparison to use of the format of the update log +x in FIG. 10.

Figure 12:
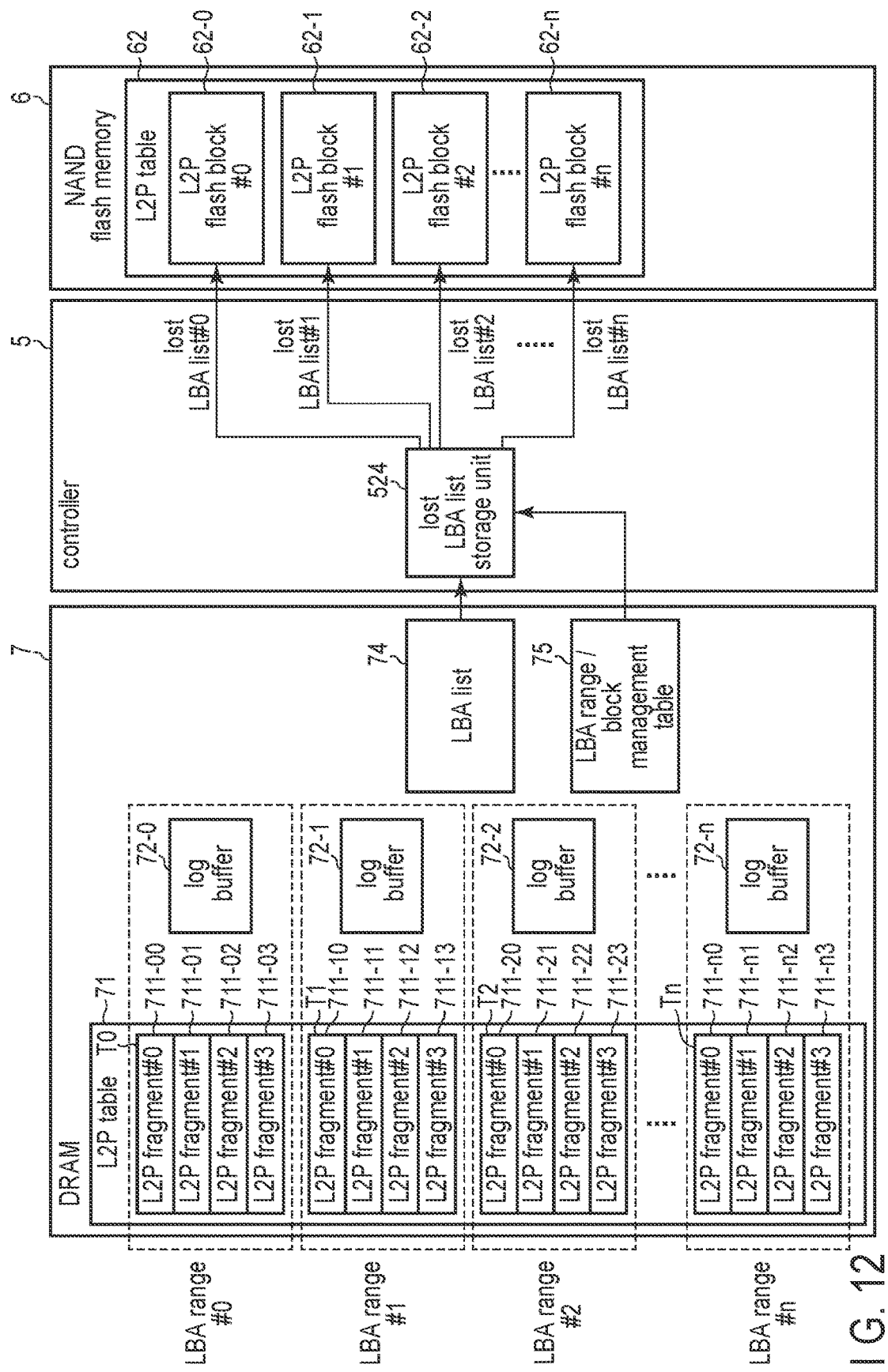
FIG. 12 illustrates first exemplary lost-LBA-list save processing in the memory system according to the embodiment.

Next, processing of saving a lost LBA list will be described. FIG. 12 illustrates first exemplary lost-LBA-list save processing in the memory system according to the embodiment.

In response to occurrence of unexpected power loss in the SSD 3, the power circuit 8 supplies the power stored in the capacitor 81 to each constituent element of the SSD 3. The power circuit 8 notifies the controller 5 of the occurrence of unexpected power loss. The controller 5 starts processing of saving the PLP target data stored in the DRAM 7 into the NAND memory 6. The PLP target data includes, for example, the L2P table 71 and an LBA list corresponding to the write data of which writing is incomplete to the NAND memory 6. The lost-LBA-list save unit 524 acquires, from the LBA list 74 of the DRAM 7, the LBA list corresponding to the write data of which writing is incomplete to the NAND memory 6. The write data of which writing is incomplete is data to be lost due to unexpected power loss.

Based on the acquired LBA list, the lost-LBA-list save unit 524 generates lost LBA lists #0 to #n corresponding, respectively, to the LBA ranges #0 to #n. The lost LBA list #0 is a list indicating a set of LBAs corresponding to the write data lost due to unexpected power loss in the write data to be written into the LBA range #0. The lost LBA list #1 is a list indicating a set of LBAs corresponding to the write data lost due to unexpected power loss in the write data to be written into the LBA range #1. The lost LBA list #n is a list indicating a set of LBAs corresponding to the write data lost due to unexpected power loss in the write data to be written into the LBA range #n. In this case, from the LBAs stored in the LBA list 74, the lost-LBA-list save unit 524 stores a set of the LBAs belonging to the LBA range #0 into the lost LBA list #0, stores a set of the LBAs belonging to the LBA range #1 into the lost LBA list #1, stores a set of the LBAs belonging to the LBA range #2 into the lost LBA list #2, and stores a set of the LBAs belonging to the LBA range #n into the lost LBA list #n.

With reference to the LBA-range/block management table 75, the lost-LBA-list save unit 524 specifies the L2P flash blocks 62-0 to 62-n allocated, respectively to the LBA ranges #0 to #n. The lost-LBA-list save unit 524 writes the lost LBA list #0 into the L2P flash block 62-0, writes the lost LBA list #1 into the L2P flash block 62-1, writes the lost LBA list #2 into the L2P flash block 62-2, and writes the lost LBA list #n into the L2P flash block 62-n.

Thus, using the power stored in the capacitor 81, the controller 5 saves the lost LBA lists #0 to #n into the L2P flash blocks 62-0 to 62-n, respectively.

Figure 13:
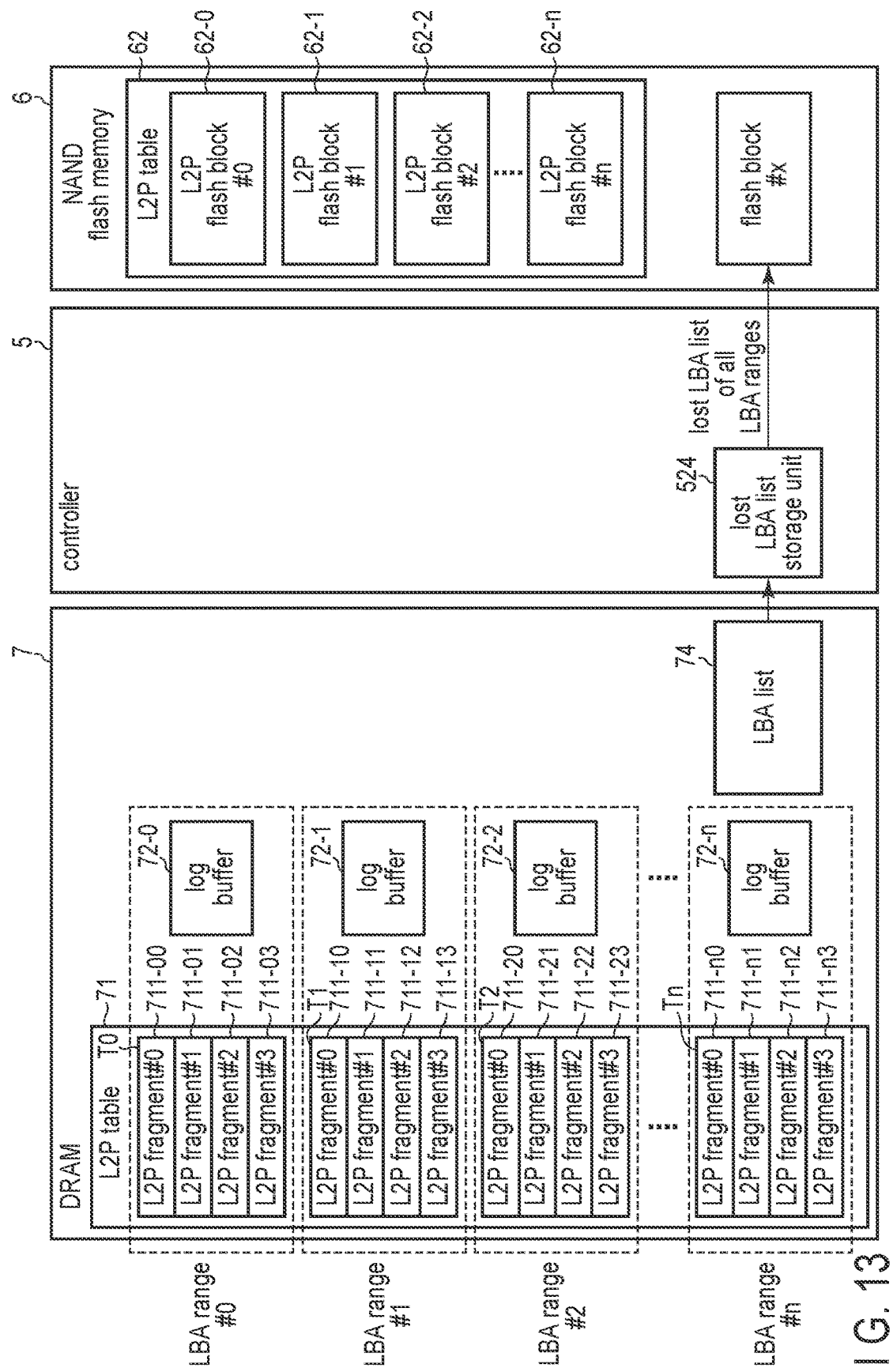
FIG. 13 illustrates second exemplary lost-LBA-list save processing in the memory system according to the embodiment.

Next, other exemplary processing of saving a lost LBA list will be described. FIG. 13 illustrates second exemplary lost-LBA-list save processing in the memory system according to the embodiment.

In response to occurrence of unexpected power loss in the SSD 3, the lost-LBA-list save unit 524 of the controller 5 acquires, from the LBA list 74 of the DRAM 7, an LBA list corresponding to the data of which writing is incomplete.

Using the power stored in the capacitor 81, the lost-LBA-list save unit 524 writes, into a flash block #x, the acquired LBA list as the lost LBA list regarding all the LBA ranges. The flash block #x is a flash block not allocated to any of the LBA ranges. Note that the lost-LBA-list save unit 524 may generate lost LBA lists #0 to #n from the acquired LBA list and then may write, into the flash block #x, the generated lost LBA lists #0 to #n as the lost LBA list regarding all the LBA ranges.

Figure 14:
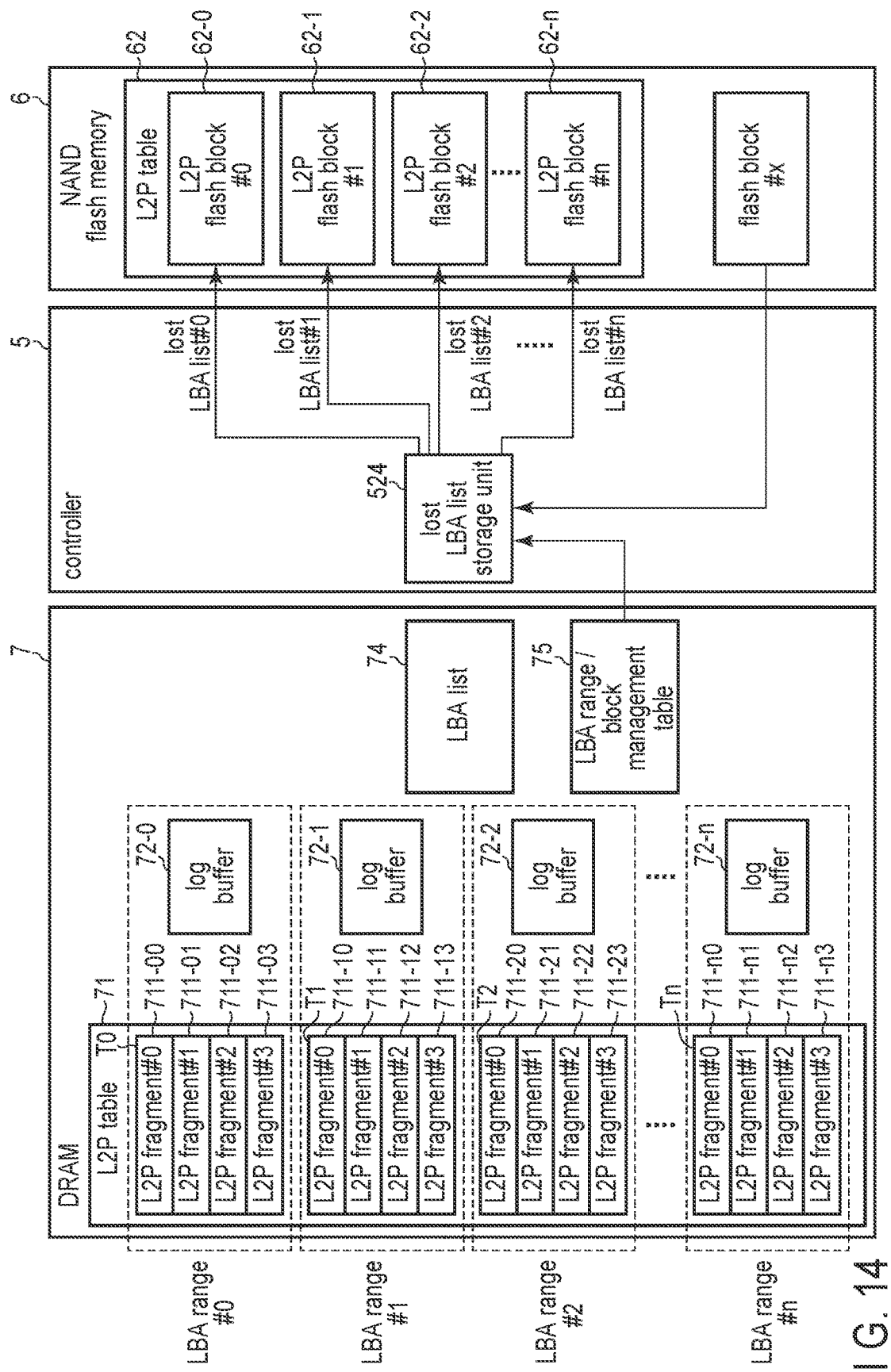
FIG. 14 illustrates exemplary lost-LBA-list distribution processing in the memory system according to the embodiment.

Next, processing of distributing the lost LBA list regarding all the LBA ranges written in the flash block #x to the L2P flash blocks 62-0 to 62-n will be described. FIG. 14 illustrates exemplary lost-LBA-list distribution processing in the memory system according to the embodiment.

In response to that power to the SSD 3 is restored after the occurrence of unexpected power loss in the SSD 3 described with reference to FIG. 13, the lost-LBA-list save unit 524 of the controller 5 reads the lost LBA list regarding all the LBA ranges from the flash block #x.

Based on the read lost LBA list regarding all the ranges, the lost-LBA-list save unit 524 generates lost LBA lists #0 to #n corresponding, respectively, to the LBA ranges #0 to #n. In this case, from the LBAs stored in the read lost LBA list regarding all the ranges, the lost-LBA-list save unit 524 stores a set of the LBAs belonging to the LBA range #0 into the lost LBA list #0, stores a set of the LBAs belonging to the LBA range #1 into the lost LBA list #1, stores a set of the LBAs belonging to the LBA range #2 into the lost LBA list #2, and stores a set of the LBAs belonging to the LBA range #n into the lost LBA list #n. Note that, in a case where the lost LBA lists #0 to #n have been written in the flash block #x as the lost LBA list regarding all the LBA ranges, no processing of generating lost LBA lists #0 to #n is required.

The lost-LBA-list save unit 524 writes the lost LBA list #0 into the L2P flash block 62-0, writes the lost LBA list #1 into the L2P flash block 62-1, writes the lost LBA list #2 into the L2P flash block 62-2, and writes the lost LBA list #n into the L2P flash block 62-n.

Next, address-translation-information save processing regarding the table area T0 corresponding to the LBA range #0 and rebuild processing regarding the table area T0 will be described with reference to FIGS. 15 to 20.

Figure 15:
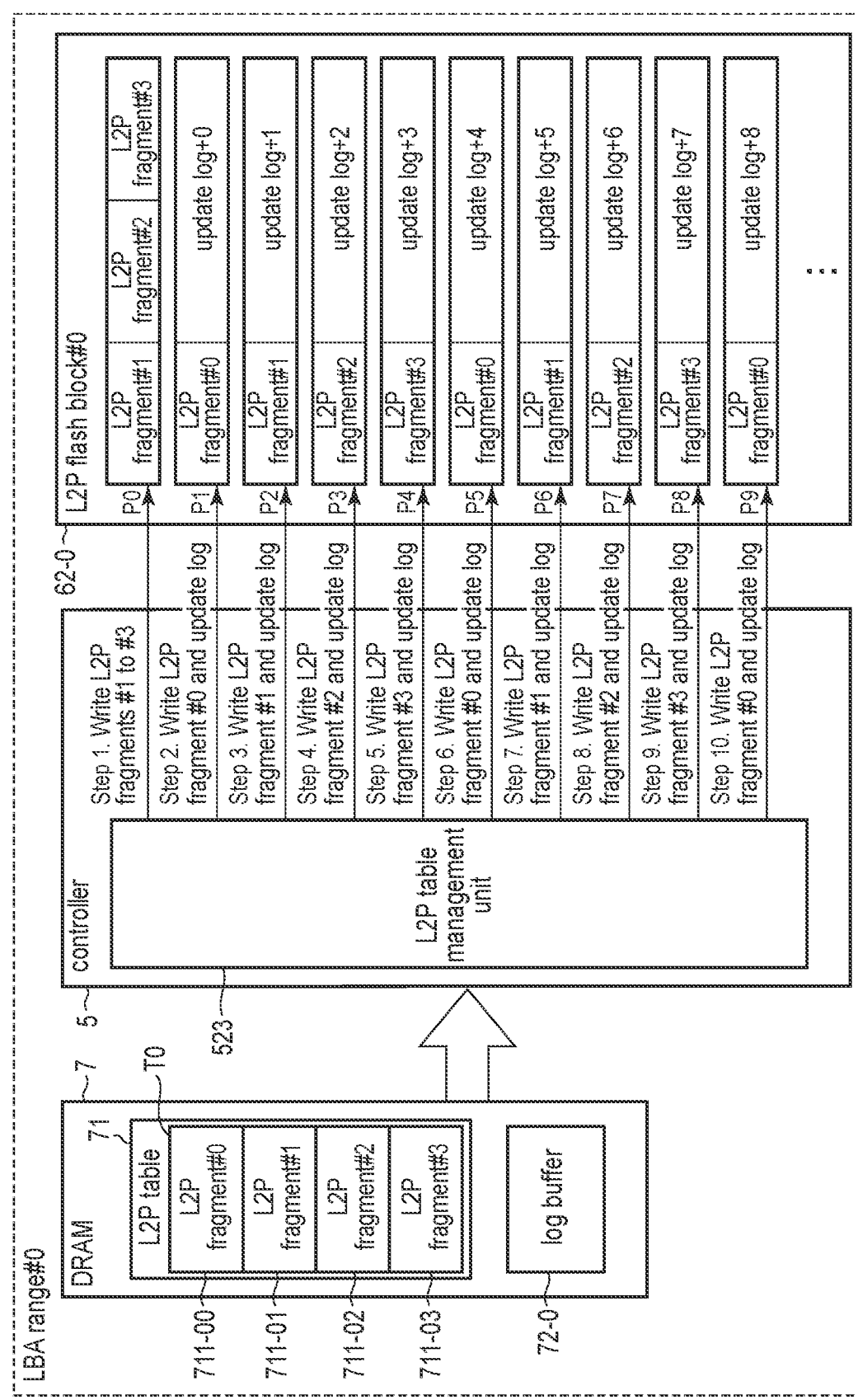
FIG. 15 illustrates first exemplary address-translation-information save processing in the memory system according to the embodiment.

First, the address-translation-information save processing will be described. FIG. 15 illustrates first exemplary address-translation-information save processing in the memory system according to the embodiment.

(Step 1) First, in response to allocation of the L2P flash block 62-0, the L2P table management unit 523 of the controller 5 acquires the L2P fragment #1, the L2P fragment #2, and the L2P fragment #3 from the table area T0 of the L2P table 71. The L2P table management unit 523 writes, into the page P0 of the L2P flash block 62-0, the acquired L2P fragment #1, L2P fragment #2, and L2P fragment #3.

(Step 2) After writing the L2P fragment #1, the L2P fragment #2, and the L2P fragment #3 into the page P0 of the L2P flash block 62-0, the L2P table management unit 523 acquires the L2P fragment #0 from the table area T0 of the L2P table 71. Every time the address translation information on the table area T0 of the L2P table 71 (L2P fragments #0 to #3) is updated, the amount of update log accumulated in the log buffer 72-0 increases. After that, when the amount of update log accumulated in the log buffer 72-0 reaches the threshold, the L2P table management unit 523 writes, into the page P1 of the L2P flash block 62-0, the acquired L2P fragment #0 and the update log +0 accumulated in the log buffer 72-0. Processing of acquiring the L2P fragment #0 from the table area T0 of the L2P table 71 is performed, for example, before a new update log is stored into the log buffer 72-0. Note that the timing at which the L2P fragment #0 is acquired is required to be before a new update log is stored into the log buffer 72-0 or before the amount of update log accumulated in the log buffer 72-0 reaches the threshold. Below, given is a case where, just after an update log is written into the L2P flash block 62-0, the next L2P fragment is acquired from the table area T0 of the L2P table 71.

(Step 3) Next, the L2P table management unit 523 acquires the L2P fragment #1 from the table area T0 of the L2P table 71. After that, when the amount of update log accumulated in the log buffer 72-0 reaches the threshold again, the acquired L2P fragment #1 and the update log +1 accumulated in the log buffer 72-0 are written into the page P2 of the L2P flash block 62-O.

(Step 4) Next, the L2P table management unit 523 acquires the L2P fragment #2 from the table area T0 of the L2P table 71. After that, when the amount of update log accumulated in the log buffer 72-0 reaches the threshold again, the L2P table management unit 523 writes, into the page P3 of the L2P flash block 62-0, the acquired L2P fragment #2 and the update log +2 accumulated in the log buffer 72-0.

(Step 5) Next, the L2P table management unit 523 acquires the L2P fragment #3 from the table area T0 of the L2P table 71. After that, when the amount of update log accumulated in the log buffer 72-0 reaches the threshold again, the L2P table management unit 523 writes, into the page P4 of the L2P flash block 62-0, the acquired L2P fragment #3 and the update log +3 accumulated in the log buffer 72-0.

(Step 6) Next, the L2P table management unit 523 acquires the L2P fragment #0 from the table area T0 of the L2P table 71. After that, when the amount of update log accumulated in the log buffer 72-0 reaches the threshold again, the L2P table management unit 523 writes, into the page P5 of the L2P flash block 62-0, the acquired L2P fragment #0 and the update log +4 accumulated in the log buffer 72-0.

(Step 7) Next, the L2P table management unit 523 acquires the L2P fragment #1 from the table area T0 of the L2P table 71. After that, when the amount of update log accumulated in the log buffer 72-0 reaches the threshold again, the L2P table management unit 523 writes, into the page P6 of the L2P flash block 62-0, the acquired L2P fragment #1 and the update log +5 accumulated in the log buffer 72-0.

(Step 8) Next, the L2P table management unit 523 acquires the L2P fragment #2 from the table area T0 of the L2P table 71. After that, when the amount of update log accumulated in the log buffer 72-0 reaches the threshold again, the L2P table management unit 523 writes, into the page P7 of the L2P flash block 62-0, the acquired L2P fragment #2 and the update log +6 accumulated in the log buffer 72-0.

(Step 9) Next, the L2P table management unit 523 acquires the L2P fragment #3 from the table area T0 of the L2P table 71. After that, when the amount of update log accumulated in the log buffer 72-0 reaches the threshold, the L2P table management unit 523 writes, into the page P8 of the L2P flash block 62-0, the acquired L2P fragment #3 and the update log +7 accumulated in the log buffer 72-0.

(Step 10) Next, the L2P table management unit 523 acquires the L2P fragment #0 from the table area T0 of the L2P table 71. After that, when the amount of update log accumulated in the log buffer 72-0 reaches the threshold, the L2P table management unit 523 writes, into the page P9 of the L2P flash block 62-0, the acquired L2P fragment #0 and the update log +8 accumulated in the log buffer 72-0.

As above, the controller 5 periodically performs processing of saving the update log accumulated in the log buffer 72-0 and an L2P fragment in the L2P table 71.

Figure 16:
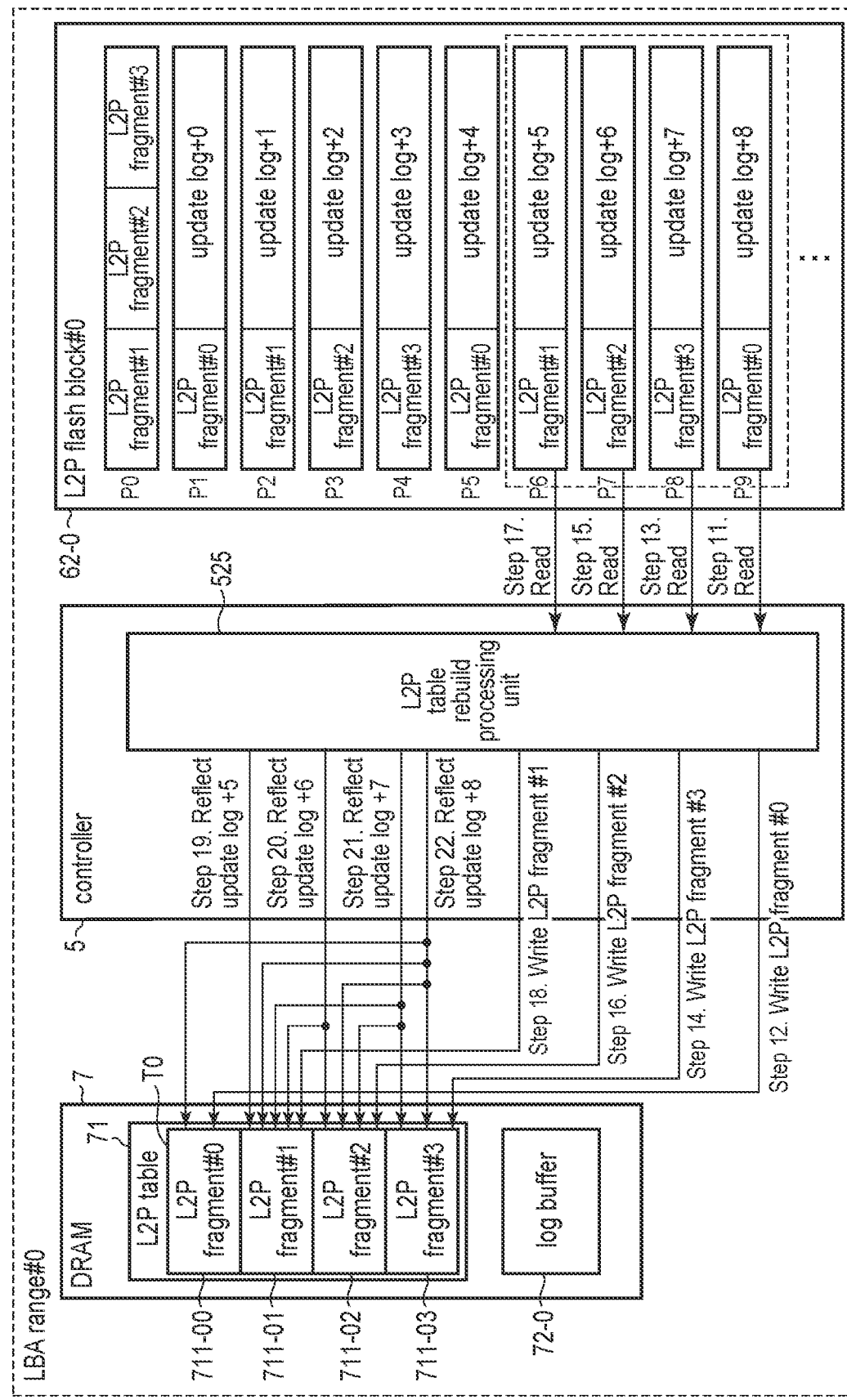
FIG. 16 illustrates first exemplary L2P table rebuild processing in the memory system according to the embodiment.

Next, L2P table rebuild processing will be described. FIG. 16 illustrates first exemplary L2P table rebuild processing in the memory system according to the embodiment.

Referring to FIG. 16, given is a case where (1) a power-shutdown advance notification is received from the host 2 after the L2P fragment #0 and the update log +8 are written into the page P9 of the L2P flash block 62-0 in Step 10 in FIG. 15, (2) update log to be saved into the NAND memory 6 is not present in the log buffer 72-0 at the time of reception of the power-shutdown advance notification, (3) the SSD 3 performs shutdown processing in response to the power-shutdown advance notification from the host 2, and then (4) the power to the SSD 3 is restored.

(Step 11) When power to the SSD 3 is restored, the L2P table rebuild processing unit 525 reads the L2P fragment #0 and the update log +8 from the page P9 of the L2P flash block 62-0. The page P9 is the page in which the latest data is written in the L2P flash block 62-0.

(Step 12) The L2P table rebuild processing unit 525 writes, into the DRAM 7, the L2P fragment #0 read in Step 11. Due to the processing in Steps 11 and 12, the latest L2P fragment #0 among the L2P fragments #0 stored in the L2P flash block 62-0 is copied from the L2P flash block 62-0 to the DRAM 7.

(Step 13) The L2P table rebuild processing unit 525 reads the L2P fragment #3 and the update log +7 from the page P8 of the L2P flash block 62-0.

(Step 14) The L2P table rebuild processing unit 525 writes, into the DRAM 7, the L2P fragment #3 read in Step 13. Due to the processing in Steps 13 and 14, the latest L2P fragment #3 among the L2P fragments #3 stored in the L2P flash block 62-0 is copied from the L2P flash block 62-0 to the DRAM 7.

(Step 15) The L2P table rebuild processing unit 525 reads the L2P fragment #2 and the update log +6 from the page P7 of the L2P flash block 62-0.

(Step 16) The L2P table rebuild processing unit 525 writes, into the DRAM 7, the L2P fragment #2 read in Step 15. Due to the processing in Steps 15 and 16, the latest L2P fragment #2 among the L2P fragments #2 stored in the L2P flash block 62-0 is copied from the L2P flash block 62-0 to the DRAM 7.

(Step 17) The L2P table rebuild processing unit 525 reads the L2P fragment #1 and the update log +5 from the page P6 of the L2P flash block 62-0.

(Step 18) The L2P table rebuild processing unit 525 writes, into the DRAM 7, the L2P fragment #1 read in Step 17. Due to the processing in Steps 17 and 18, the latest L2P fragment #1 among the L2P fragments #1 stored in the L2P flash block 62-0 is copied from the L2P flash block 62-0 to the DRAM 7.

(Step 19) The L2P table rebuild processing unit 525 reflects the content of the update log +5 read in Step 17 only to the L2P fragment #1 copied to the DRAM 7. That is, the content of the update log (herein, the update log +5) paired with the L2P fragment #1, stored in the L2P flash block 62-0, is reflected only to the L2P fragment #1 copied to the DRAM 7. The L2P fragments #2, #3, and #0 stored in the L2P flash block 62-0 are each information later than the update log +5. The L2P fragments #2, #3, and #0 copied to the DRAM 7 each have the content of the update log +5 already reflected thereto. Thus, omitted is processing of reflecting the content of the update log +5 to the L2P fragments #2, #3, and #0. Thus, a reduction can be made in the time required for the L2P table rebuild processing.

(Step 20) The L2P table rebuild processing unit 525 reflects the content of the update log +6 read in Step 15 only to the L2P fragment #1 and the L2P fragment #2 copied to the DRAM 7. That is, the content of the update log (herein, the update log +6) paired with the L2P fragment #2, stored in the L2P flash block 62-0, is reflected only to the L2P fragments #1 and #2 copied to the DRAM 7. The L2P fragments #3 and #0 stored in the L2P flash block 62-0 are each information later than the update log +6. The L2P fragments #3 and #0 copied to the DRAM 7 each have the content of the update log +6 already reflected thereto. Thus, omitted is processing of reflecting the content of the update log +6 to the L2P fragments #3 and #0.

(Step 21) The L2P table rebuild processing unit 525 reflects the content of the update log +7 read in Step 13 only to the L2P fragment #1, the L2P fragment #2, and the L2P fragment #3 copied to the DRAM 7. That is, the content of the update log (herein, the update log +7) paired with the L2P fragment #3, stored in the L2P flash block 62-0, is reflected only to the L2P fragments #1, #2, and #3 copied to the DRAM 7. The L2P fragment #0 stored in the L2P flash block 62-0 is information later than the update log +7. The L2P fragment #0 copied to the DRAM 7 has the content of the update log +7 already reflected thereto. Thus, omitted is processing of reflecting the content of the update log +7 to the L2P fragment #0.

(Step 22) The L2P table rebuild processing unit 525 reflects the content of the update log +8 read in Step 11 to the L2P fragment #0, the L2P fragment #1, the L2P fragment #2, and the L2P fragment #3 copied to the DRAM 7.

As above, the controller 5 reads an L2P fragment and an update log stored in the L2P flash block 62-0 and rebuilds the latest address translation information on the table area T0 of the L2P table 71 (L2P fragments #0 to #3).

Next, exemplary address-translation-information/update-log save processing and lost-LBA-list save processing will be described. FIG. 17 illustrates second exemplary address-translation-information save processing in the memory system according to the embodiment. Herein, given is a case where unexpected power loss occurs in the SSD 3.

The controller 5 operates like the operation from Steps 1 to 9 in FIG. 15. Given is a case where unexpected power loss occurs in the SSD 3 after the write operation is completed in Step 9, while unsaved update log which is not yet saved into the L2P flash block 62-0 is not stored in the log buffer 72-0 at the time of occurrence of the unexpected power loss.

(Step 10) The controller 5 determines whether or not an unsaved update log which is not yet saved into the L2P flash block 62-0 is stored in the log buffer 72-0. Herein, given is a case where no unsaved update log which is not yet saved into the L2P flash block 62-0 is stored in the log buffer 72-0 due to occurrence of unexpected power loss in the SSD 3 just after the write operation is completed in Step 9. In this case, the controller 5 writes a lost LBA list into the page P9 of the L2P flash block 62-0. The lost LBA list written in the page P9 of the L2P flash block 62-0 is a list of the LBAs belonging to the LBA range #0 among the LBAs corresponding to the write data of which writing is incomplete to the NAND memory 6.

Figure 18:
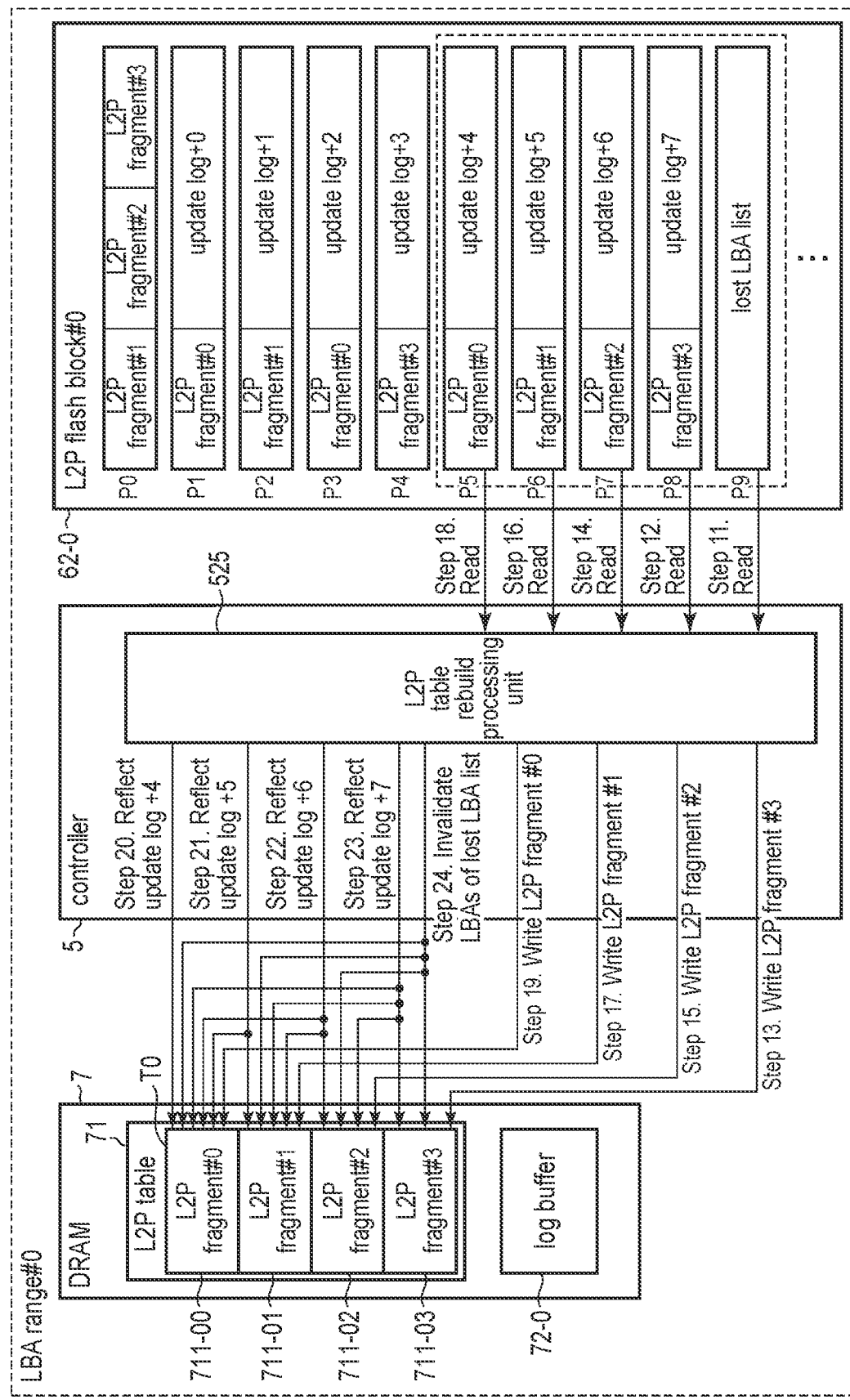
FIG. 18 illustrates second exemplary L2P table rebuild processing in the memory system according to the embodiment.

Next, second exemplary L2P table rebuild processing will be described. FIG. 18 illustrates the second exemplary L2P table rebuild processing in the memory system according to the embodiment.

Referring to FIG. 18, given is a case where power to the SSD 3 is restored after Step 10 in FIG. 17.

(Step 11) The L2P table rebuild processing unit 525 reads the lost LBA list from the page P9 of the L2P flash block 62-0. The page P9 is the page in which the latest data is written in the L2P flash block 62-0.

(Step 12) The L2P table rebuild processing unit 525 reads the L2P fragment #3 and the update log +7 from the page P8 of the L2P flash block 62-0.

(Step 13) The L2P table rebuild processing unit 525 writes, into the DRAM 7, the L2P fragment #3 read in Step 12. Due to the processing in Steps 12 and 13, the latest L2P fragment #3 among the L2P fragments #3 stored in the L2P flash block 62-0 is copied from the L2P flash block 62-0 to the DRAM 7.

(Step 14) The L2P table rebuild processing unit 525 reads the L2P fragment #2 and the update log +6 from the page P7 of the L2P flash block 62-0.

(Step 15) The L2P table rebuild processing unit 525 writes, into the DRAM 7, the L2P fragment #2 read in Step 14. Due to the processing in Steps 14 and 15, the latest L2P fragment #2 among the L2P fragments #2 stored in the L2P flash block 62-0 is copied from the L2P flash block 62-0 to the DRAM 7.

(Step 16) The L2P table rebuild processing unit 525 reads the L2P fragment #1 and the update log +5 from the page P6 of the L2P flash block 62-0.

(Step 17) The L2P table rebuild processing unit 525 writes, into the DRAM 7, the L2P fragment #1 read in Step 16. Due to the processing in Steps 16 and 17, the latest L2P fragment #1 among the L2P fragments #1 stored in the L2P flash block 62-0 is copied from the L2P flash block 62-0 to the DRAM 7.

(Step 18) The L2P table rebuild processing unit 525 reads the L2P fragment #0 and the update log +4 from the page P5 of the L2P flash block 62-0.

(Step 19) The L2P table rebuild processing unit 525 writes, into the DRAM 7, the L2P fragment #0 read in Step 18. Due to the processing in Steps 18 and 19, the latest L2P fragment #0 among the L2P fragments #0 stored in the L2P flash block 62-0 is copied from the L2P flash block 62-0 to the DRAM 7.

(Step 20) The L2P table rebuild processing unit 525 reflects the content of the update log +4 read in Step 18 only to the L2P fragment #0 copied to the DRAM 7.

(Step 21) The L2P table rebuild processing unit 525 reflects the content of the update log +5 read in Step 16 only to the L2P fragment #0 and the L2P fragment #1 copied to the DRAM 7.

(Step 22) The L2P table rebuild processing unit 525 reflects the content of the update log +6 read in Step 14 only to the L2P fragment #0, the L2P fragment #1, and the L2P fragment #2 copied to the DRAM 7.

(Step 23) The L2P table rebuild processing unit 525 reflects the content of the update log +7 read in Step 12 to the L2P fragment #0, the L2P fragment #1, the L2P fragment #2, and the L2P fragment #3 copied to the DRAM 7. Due to the above processing, the address translation information on the table area T0 (L2P fragments #0 to #3) just before the occurrence of unexpected power loss is rebuilt on the DRAM 7.

(Step 24) Based on the lost LBA list read in Step 11, the L2P table rebuild processing unit 525 updates the address translation information on the table area T0 (L2P fragments #0 to #3) such that a value indicating an error (uncorrectable data error) is associated with each of the LBAs corresponding to the lost write data.

Thus, even in a case where a read command specifying an LBA corresponding to the lost write data is received from the host 2, the controller 5 can notify the host 2 of an error. Therefore, a fault can be prevented, such as wrong return of data, different from the data corresponding to the LBA specified by the read command, to the host 2.

Figure 19:
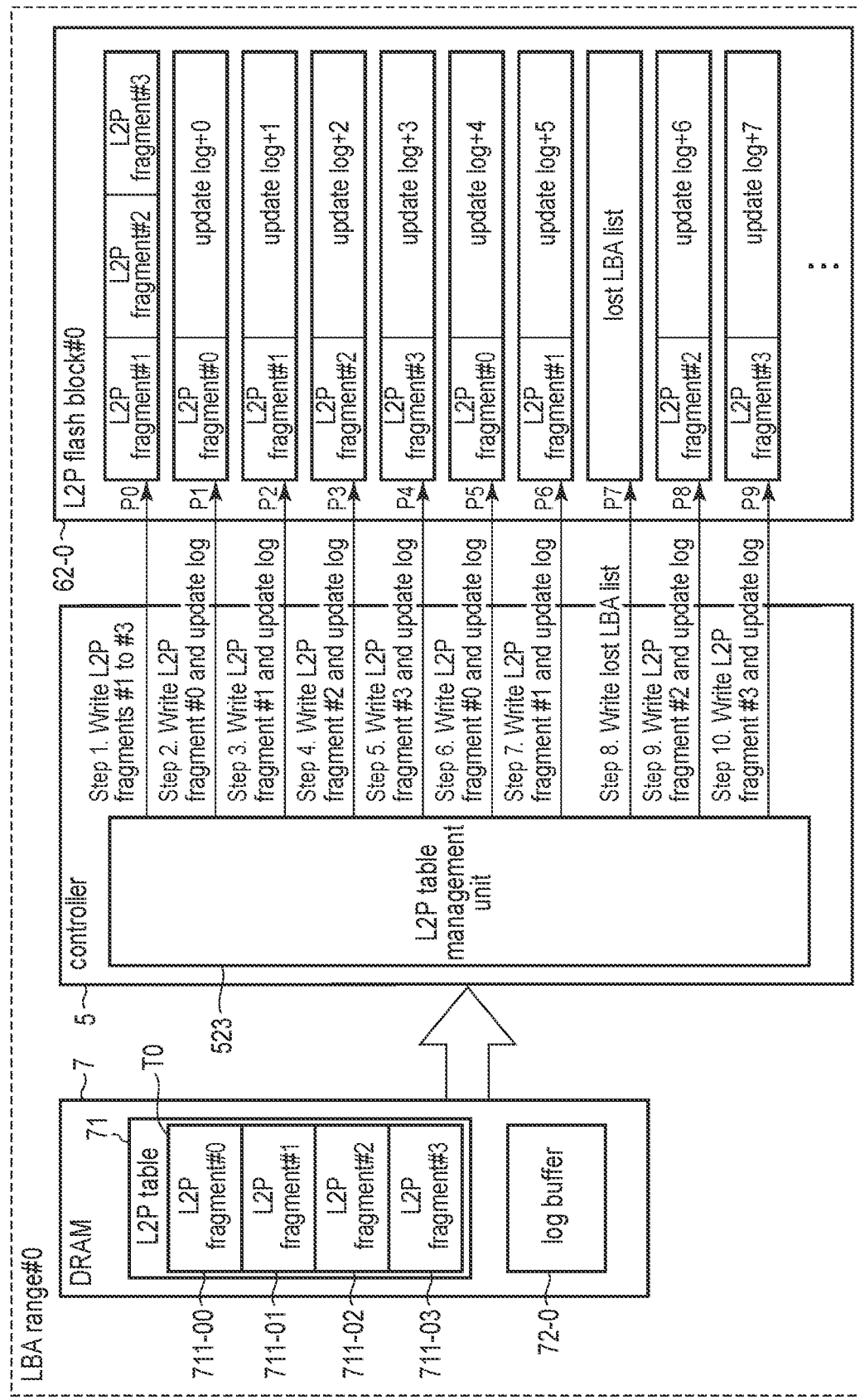
FIG. 19 illustrates third exemplary address-translation-information save processing in the memory system according to the embodiment.

Next, third exemplary address-translation-information save processing will be described. FIG. 19 illustrates the third exemplary address-translation-information save processing in the memory system according to the embodiment.

The controller 5 operates like the operation from Steps 1 to 6 in FIG. 15. Here, given is a case where (1) unexpected power loss occurs after the write operation is completed in Step 6, (2) an unsaved update log which is not saved into the L2P flash block 62-0 has been stored in the log buffer 72-0 before the unexpected power loss occurs, and then (3) power to the SSD 3 is restored.

(Step 7) The L2P table management unit 523 determines whether or not an unsaved update log which is not yet saved into the L2P flash block 62-0 is stored in the log buffer 72-0. In a case where an unsaved update log which is not yet saved into the L2P flash block 62-0 is stored in the log buffer 72-0, the L2P table management unit 523 writes, into the page P6 of the L2P flash block 62-0, the L2P fragment #1 as the next L2P fragment to be saved to the L2P flash block 62-0 and the unsaved update log (update log +5) stored in the log buffer 72-0.

(Step 8) The L2P table management unit 523 writes a lost LBA list into the page P7 of the L2P flash block 62-0. The lost LBA list written in the page P7 of the L2P flash block 62-0 is a list of the LBAs belonging to the LBA range #0 among the LBAs corresponding to the write data of which writing is incomplete to the NAND memory 6.

(Step 9) After that, in response to restoration of power to the SSD 3, the SSD 3 starts operating again. The L2P table management unit 523 acquires the L2P fragment #2 from the table area T0 of the L2P table 71. After that, when the amount of update log accumulated in the log buffer 72-0 reaches the threshold, the L2P table management unit 523 writes, into the page P8 of the L2P flash block 62-0, the acquired L2P fragment #2 and the update log +6 accumulated in the log buffer 72-0.

(Step 10) Next, the L2P table management unit 523 acquires the L2P fragment #3 from the table area T0 of the L2P table 71. After that, when the amount of update log accumulated in the log buffer 72-0 reaches the threshold, the L2P table management unit 523 writes, into the page P9 of the L2P flash block 62-0, the acquired L2P fragment #3 and the update log +7 accumulated in the log buffer 72-0.

Figure 20:
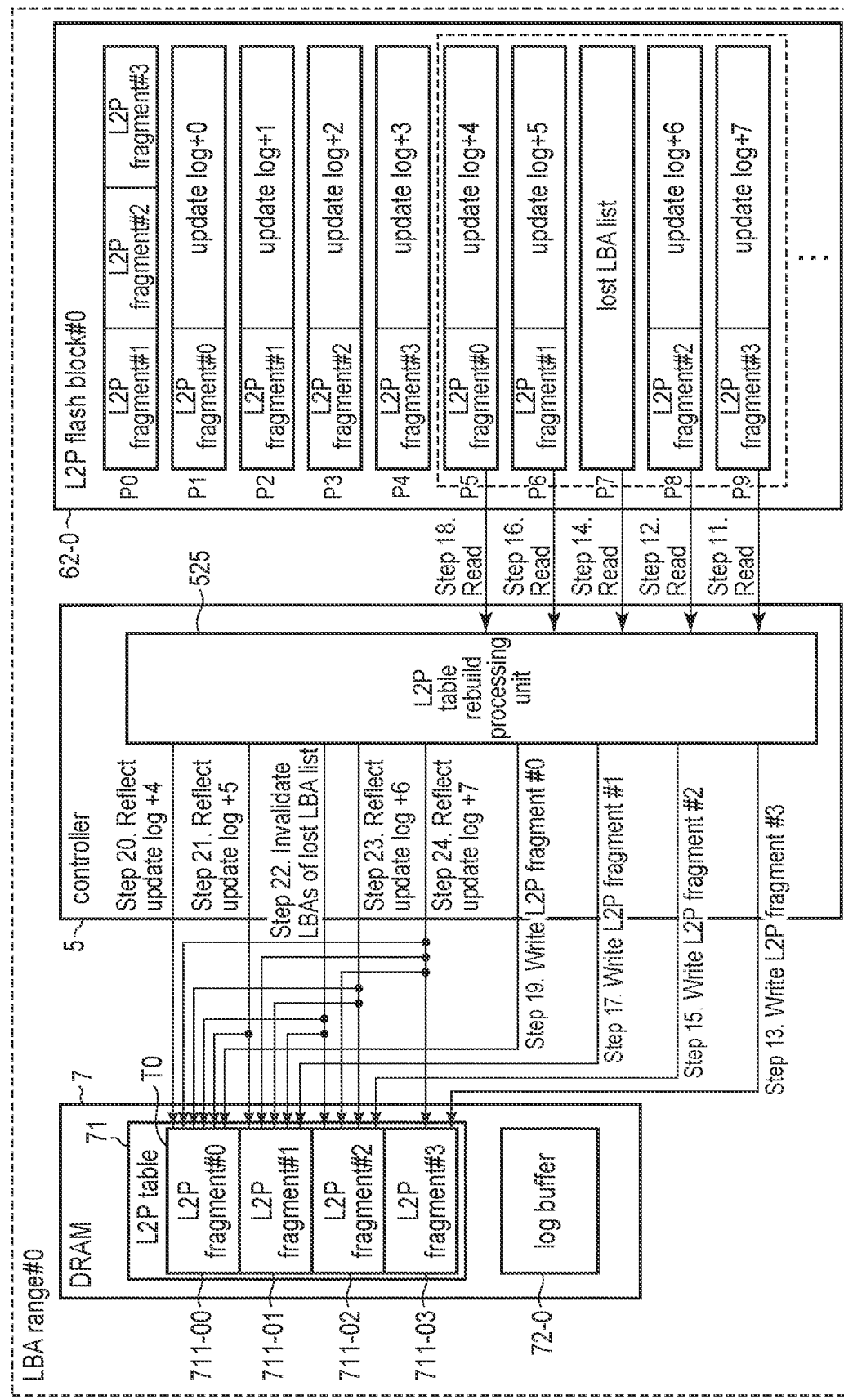
FIG. 20 illustrates third exemplary L2P table rebuild processing in the memory system according to the embodiment.

Next, third exemplary L2P table rebuild processing will be described. FIG. 20 illustrates the third exemplary L2P table rebuild processing in the memory system according to the embodiment.

Referring to FIG. 20, given is a case where power to the SSD 3 is restored after the SSD 3 performs shutdown processing after the L2P fragment #3 and the update log +7 are written into the page P9 of the L2P flash block 62-0 in Step 10 in FIG. 19.

(Step 11) The L2P table rebuild processing unit 525 reads the L2P fragment #3 and the update log +7 from the page P9 of the L2P flash block 62-0. The page P9 is the page in which the latest data is written in the L2P flash block 62-0.

(Step 12) The L2P table rebuild processing unit 525 writes, into the DRAM 7, the L2P fragment #3 read in Step 11. Due to the processing in Steps 11 and 12, the latest L2P fragment #3 among the L2P fragments #3 stored in the L2P flash block 62-0 is copied from the L2P flash block 62-0 to the DRAM 7.

(Step 13) The L2P table rebuild processing unit 525 reads the L2P fragment #2 and the update log +6 from the page P8 of the L2P flash block 62-0.

(Step 14) The L2P table rebuild processing unit 525 writes, into the DRAM 7, the L2P fragment #2 read in Step 13. Due to the processing in Steps 13 and 14, the latest L2P fragment #2 among the L2P fragments #2 stored in the L2P flash block 62-0 is copied from the L2P flash block 62-0 to the DRAM 7.

(Step 15) The L2P table rebuild processing unit 525 reads the lost LBA list from the page P7 of the L2P flash block 62-0.

(Step 16) The L2P table rebuild processing unit 525 reads the L2P fragment #1 and the update log +5 from the page P6 of the L2P flash block 62-0.

(Step 17) The L2P table rebuild processing unit 525 writes, into the DRAM 7, the L2P fragment #1 read in Step 16. Due to the processing in Steps 16 and 17, the latest L2P fragment #1 among the L2P fragments #1 stored in the L2P flash block 62-0 is copied from the L2P flash block 62-0 to the DRAM 7.

(Step 18) The L2P table rebuild processing unit 525 reads the L2P fragment #0 and the update log +4 from the page P5 of the L2P flash block 62-0.

(Step 19) The L2P table rebuild processing unit 525 writes, into the DRAM 7, the L2P fragment #0 read in Step 18. Due to the processing in Steps 18 and 19, the latest L2P fragment #0 among the L2P fragments #0 stored in the L2P flash block 62-0 is copied from the L2P flash block 62-0 to the DRAM 7.

(Step 20) The L2P table rebuild processing unit 525 reflects the content of the update log +4 read in Step 18 only to the L2P fragment #0 copied to the DRAM 7.

(Step 21) The L2P table rebuild processing unit 525 reflects the content of the update log +5 read in Step 16 only to the L2P fragment #0 and the L2P fragment #1 copied to the DRAM 7.

(Step 22) Based on the lost LBA list read in Step 15, the L2P table rebuild processing unit 525 updates only the address translation information included in the L2P fragment #0 and the L2P fragment #1 in the address translation information on the table area T0 such that a value indicating an error (uncorrectable data error) is associated with each of the LBAs corresponding to the lost write data. The L2P fragment #2 and the L2P fragment #3 stored in the L2P flash block 62-0 are information later than the lost LBA list. The address translation information included in the L2P fragments #2 and #3 copied to the DRAM 7 has already been updated based on the lost LBA list. Thus, omitted is processing of updating the address translation information included in the L2P fragment #2 and the L2P fragment #3 based on the lost LBA list.

(Step 23) The L2P table rebuild processing unit 525 reflects the content of the update log +6 read in Step 13 to the L2P fragment #0, the L2P fragment #1, and the L2P fragment #2 copied to the DRAM 7.

(Step 24) The L2P table rebuild processing unit 525 reflects the content of the update log +7 read in Step 11 to the L2P fragment #0, the L2P fragment #1, the L2P fragment #2, and the L2P fragment #3 copied to the DRAM 7.

As above, in a case where the lost LBA list is read in restoring the table area T0, the controller 5 changes, to a value indicating an error, the address translation information stored in the table area T0 restored with an L2P fragment written in the L2P flash block before the point in time the lost LBA list is written. Thus, even in a case where a read command specifying an LBA corresponding to the write data lost in the past is received from the host 2, the controller 5 can notify the host 2 of an error. Therefore, a fault can be prevented, such as wrong return of data, different from the data corresponding to the LBA specified by the read command, to the host 2.

Figure 21:
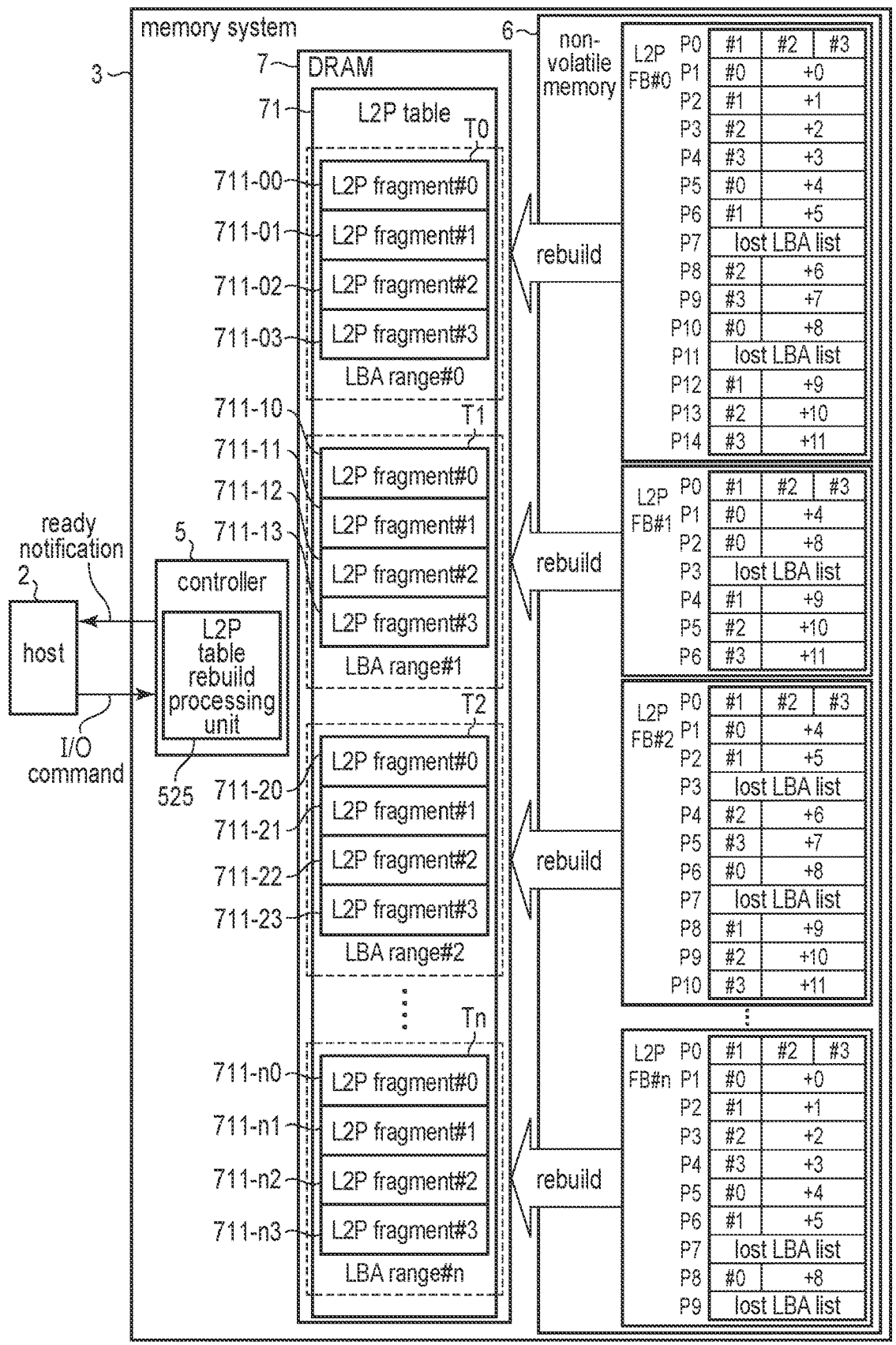
FIG. 21 illustrates processing of selecting a rebuild target table area in the memory system according to the embodiment.

Next, processing of selecting a rebuild target table area will be described. FIG. 21 illustrates the processing of selecting a rebuild target table area in the memory system according to the embodiment.

In response to restoration of power to the SSD 3, the controller 5 notifies the host 2 that the SSD 3 is ready to process an I/O command.

The host 2 notified that the SSD 3 is ready determines that read/write access to the SSD 3 is performable. Then, the host 2 transmits, to the SSD 3, an I/O command specifying an LBA belonging to an LBA range.

The controller 5 having received the I/O command acquires the LBA specified by the I/O command. In a case where the I/O command is a write command, the LBA specified by the I/O command is an LBA into which write data is to be written. In a case where the I/O command is a read command, the LBA specified by the I/O command is an LBA in which read target data has been written. Then, the controller 5 selects, as the rebuild target, the table area corresponding to the LBA range to which the acquired LBA belongs, with priority over the other table areas.

For example, in a case where the LBA specified by the write command received from the host 2 is an LBA belonging to the LBA range #1, the L2P table rebuild processing unit 525 selects, as the rebuild target, the table area T1 of the L2P table 71. Then, the L2P table rebuild processing unit 525 reads the L2P fragments #3, #2, and #1 from the page P6, page P5, and page P4 of the L2P flash block #1, respectively, and reads the update logs +11, +10, and +9 from the page P6, page P5, and page P4 of the L2P flash block #1, respectively. The L2P table rebuild processing unit 525 reads the lost LBA list from the page P3 of the L2P flash block #1. The L2P table rebuild processing unit 525 reads the L2P fragment #0 and the update log +8 from the page P2 of the L2P flash block #1. With the read L2P fragments, update logs, and lost LBA list, the L2P table rebuild processing unit 525 rebuilds the table area T1. Then, in response to completion of rebuilding of the table area T1, the controller 5 processes the received write command.

Thus, before rebuilding of all the table areas of the L2P table 71, the controller 5 can accept read/write access from the host 2. The controller 5 can process the I/O command received before rebuilding of the L2P table 71.

In a case where rebuild processing can be performed to a plurality of table areas, simultaneously, the controller 5 determines at least one rebuild target table area, based on the LBA specified by the I/O command received from the host 2. For example, in a case where the controller 5 includes two or more CPUs 52, the controller 5 performs processing of rebuilding two or more table areas, simultaneously.

For example, in a case where the controller 5 can restore two table areas simultaneously, in response to reception of a write command specifying an LBA belonging to the LBA range #1, the L2P table rebuild processing unit 525 selects, as a rebuild target, the table area T1 with priority. Then, the L2P table rebuild processing unit 525 further selects, as another rebuild target, any one table area (e.g., the table area T0) among the other table areas different from the table area T1 selected with priority. Thus, the L2P table rebuild processing unit 525 selects, as rebuild targets, two table areas (table areas T0 and T1). Then, the L2P table rebuild processing unit 525 performs processing of rebuilding the two table areas (table areas T0 and T1), selected as rebuild targets, simultaneously.

Next, a procedure of address-translation-information save processing will be described. FIG. 22 is a flowchart illustrating a procedure of address-translation-information save processing in the memory system according to the embodiment.

First, the controller 5 determines whether or not any of the amounts of update log accumulated in the log buffers corresponding to the LBA ranges has reached the threshold (Step S101).

In a case where any of the amounts of update log accumulated in the log buffers corresponding to the LBA ranges has not reached the threshold (No in Step S101), the controller 5 waits until any of the amounts of update log reaches the threshold.

In a case where any of the amounts of update log accumulated in the log buffers corresponding to the LBA ranges has reached the threshold (Yes in Step S101), the controller 5 selects an L2P fragment in the LBA range corresponding to the log buffer (Step S102). The L2P fragment to be selected in Step S102 may be acquired in advance from the table area in the L2P table 71.

The controller 5 writes, into the L2P flash block, the L2P fragment selected in Step S102 and the update log accumulated in the log buffer (Step S103).

After that, the controller 5 may acquire, from the table area in the L2P table 71, the next L2P fragment to be written into the L2P flash block.

Figure 23:
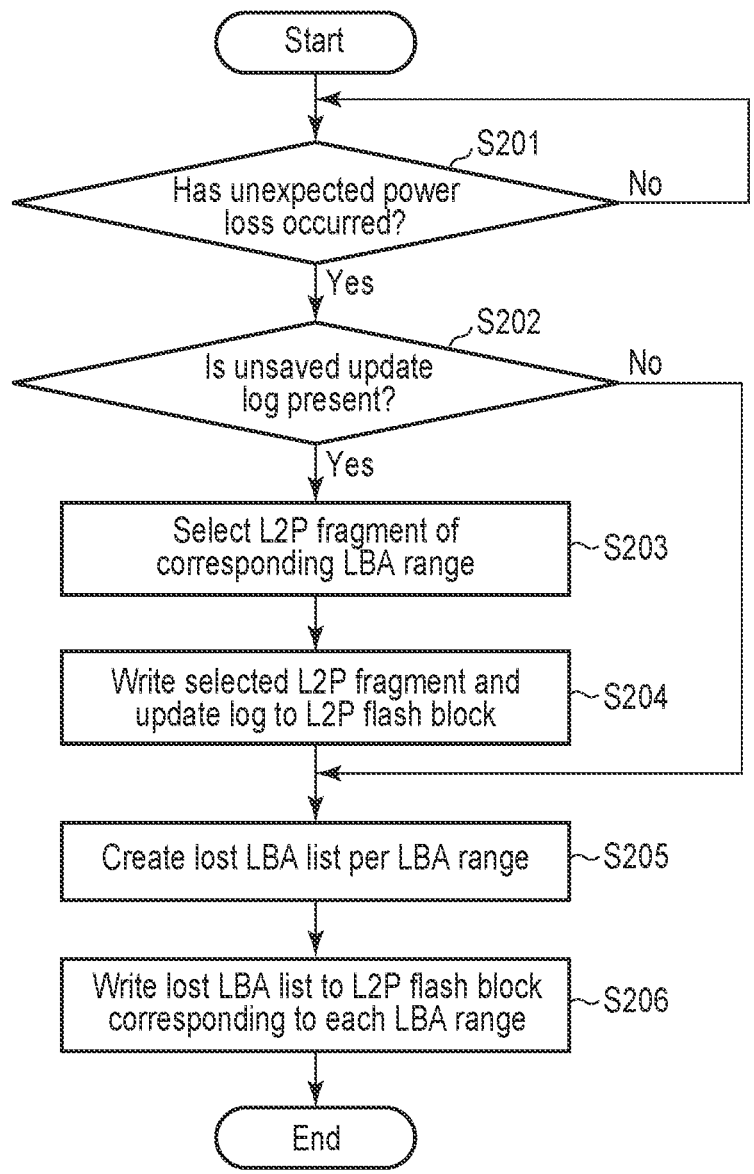
FIG. 23 is a flowchart illustrating a first exemplary procedure of lost-LBA-list save processing in the memory system according to the embodiment.

Next, first exemplary lost-LBA-list save processing will be described. FIG. 23 is a flowchart illustrating a first exemplary procedure of lost-LBA-list save processing in the memory system according to the embodiment.

First, the controller 5 determines whether or not unexpected power loss has occurred in the SSD 3 (Step S201).

In a case where no unexpected power loss has occurred (No in Step S201), the controller 5 waits.

In a case where unexpected power loss has occurred (Yes in Step S201), the controller 5 determines whether or not an unsaved update log is present in a log buffer (Step S202). The following operations are performed using the power stored in the capacitor 81.

In a case where an unsaved update log is present (Yes in Step S202), the controller 5 selects an L2P fragment in the LBA range corresponding to the log buffer in which the unsaved update log is stored (Step S203).

The controller 5 writes, into an L2P flash block, the L2P fragment selected in Step S203 and the update log (Step S204).

In a case where no unsaved update log is present (No in Step S202), the controller 5 skips a procedure of Steps S203 and S204.

The controller 5 distributes the LBAs stored in the LBA list 74 to the LBA ranges to create a lost LBA list per LBA range (Step S205).

The controller 5 writes each lost LBA list created in Step S205 into the L2P flash block corresponding to the identical LBA range (Step S206).

Next, second exemplary lost-LBA-list save processing will be described. FIG. 24 is a flowchart illustrating a second exemplary procedure of lost-LBA-list save processing in the memory system according to the embodiment.

First, the controller 5 determines whether or not unexpected power loss has occurred in the SSD 3 (Step S301).

In a case where no unexpected power loss has occurred (No in Step S301), the controller 5 waits.

In a case where unexpected power loss has occurred (Yes in Step S301), the controller 5 determines whether or not an unsaved update log is present in a log buffer (Step S302). Operations to be performed before restoration of power is made are performed using the power stored in the capacitor 81.

In a case where an unsaved update log is present (Yes in Step S302), the controller 5 selects an L2P fragment in the LBA range corresponding to the log buffer in which the unsaved update log is stored (Step S303).

The controller 5 writes, into an L2P flash block, the L2P fragment selected in Step S303 and the update log (Step S304).

In a case where no unsaved update log is present (No in Step S302), the controller 5 skips a procedure of Steps S303 and S304.

The controller 5 writes, into any flash block, the lost LBA list corresponding to all the LBA ranges (Step S305). The write destination flash block is a block not allocated, as an L2P flash block, to any of the LBA ranges.

Then, when power to the SSD 3 is restored (Yes in Step S306), the controller 5 reads the lost LBA list corresponding to all the LBA ranges written in Step S305 (Step S307).

The controller 5 distributes, to the LBA ranges, the LBAs stored in the lost LBA list read in Step S307 to create a lost LBA list per LBA range (Step S308).

The controller 5 writes each lost LBA list created in Step S308 into the L2P flash block corresponding to the identical LBA range (Step S309).

Next, a procedure of L2P table rebuild processing will be described. FIG. 25 is a flowchart illustrating a procedure of L2P table rebuild processing in the memory system according to the embodiment.

First, the controller 5 determines whether or not power is supplied to the SSD 3 (Step S401).

In a case where the power is not supplied to the SSD 3 (No in Step S401), the controller 5 waits.

In a case where the power is supplied to the SSD 3 (Yes in Step S401), the controller 5 notifies the host 2 that the SSD 3 is ready to process an I/O command (Step S402).

The controller 5 determines whether or not an I/O command has been received from the host 2 (Step S403).

In a case where an I/O command has been received from the host 2 (Yes in Step S403), the controller 5 selects the LBA range to which an LBA specified by the I/O command received in Step S403 belongs (Step S404).

In a case where no I/O command has been received from the host 2 (No in Step S403), the controller 5 selects any LBA range (Step S405).

The controller 5 performs processing of rebuilding the table area corresponding to the LBA range selected in Step S404 or S405 (Step S406).

The controller 5 starts to process the I/O command specifying the LBA belonging to the LBA range corresponding to the table area rebuilt in Step S406 (Step S407). In a case where an I/O command has been received in Step S403, the controller 5 starts to process the I/O command.

The controller 5 determines whether or not an un-rebuilt table area is present (Step S408).

In a case where an un-rebuilt table area is present (Yes in Step S408), the controller 5 goes back to Step S403.

In a case where no un-rebuilt table area is present (No in Step S408), the controller 5 terminates the rebuild processing.

As described above, according to the present embodiment, in response to occurrence of unexpected power loss, the controller 5 writes, into the NAND memory 6, a lost LBA list as an LBA list corresponding to lost write data, using the power stored in the capacitor 81. For example, the controller 5 writes the lost LBA list #0 into the L2P flash block #0 corresponding to the LBA range #0 and writes the lost LBA list #1 into the L2P flash block #1 corresponding to the LBA range #1. The lost LBA list #0 is a list of LBAs belonging to the LBA range #0 among the LBAs corresponding to the lost write data. The lost LBA list #1 is a list of LBAs belonging to the LBA range #1 among the LBAs corresponding to the lost write data.

Alternatively, the controller 5 writes, into a predetermined single block, the lost LBA list #0 and the lost LBA list #1. Then, in response to that supply of power to the SSD 3 is restored, the controller 5 copies the lost LBA list #0 and the lost LBA list #1 from the single block to the L2P flash block #0 and the L2P flash block #1, respectively.

Thus, the controller 5 can record the LBAs corresponding to the write data lost due to unexpected power loss. Thus, in response to reception of a read command specifying an LBA corresponding to the lost write data, the controller 5 can notify the host 2 of an error.

Furthermore, when the supply of power to the SSD 3 starts, the controller 5 notifies the host 2 that the SSD 3 is ready to process an I/O command. In response to reception of an I/O command specifying an LBA belonging to a certain LBA range from the host 2, the controller 5 selects, as the rebuild target, a table area corresponding to the LBA range to which the specified LBA belongs, with priority. The controller 5 performs processing of rebuilding the table area selected as the rebuild target. Then, in response to completion of rebuilding of the table area, the controller 5 starts to process the received I/O command.

Thus, before completion of rebuilding to all the table areas, the controller 5 can start to process the I/O command received from the host 2. That is, a reduction can be made in the period during which the host 2 waits until read/write access to the SSD 3 is made performable.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system connectable to a host, the memory system comprising:
a nonvolatile memory including a plurality of blocks;
a volatile memory; and
a controller configured to manage address translation information indicating a correspondence between each of logical addresses in a logical address space of the memory system and each of physical addresses of the nonvolatile memory, using a logical-to-physical address translation table stored in the volatile memory, wherein
the controller is configured to:
divide the logical-to-physical address translation table into a plurality of table areas including at least a first table area corresponding to a first logical address range and a second table area corresponding to a second logical address range;
periodically perform first processing of writing, into a first block among the plurality of blocks, address translation information on the first table area acquired from the volatile memory and an update log indicating an update content of the address translation information on the first table area updated after acquisition of the address translation information on the first table area;
periodically perform second processing of writing, into a second block among the plurality of blocks, address translation information on the second table area acquired from the volatile memory and an update log indicating an update content of the address translation information on the second table area updated after acquisition of the address translation information on the second table area;
save, into the first block and the second block, a first list indicating a list of logical addresses corresponding to first write data lost due to unexpected power loss among write data to be written into the first logical address range and a second list indicating a list of logical addresses corresponding to second write data lost due to the unexpected power loss among write data to be written into the second logical address range, respectively;
in response to restoration of power to the memory system, notify the host that the memory system is ready to process an input/output command;
when an input/output command specifying a logical address belonging to one logical address range of the first logical address range and the second logical address range is received from the host,
select a block corresponding to the one logical address range from the first block and the second block, and rebuild, onto the volatile memory, based on the address translation information on the table area stored in the selected block and the update log of the address translation information, stored in the selected block, latest address translation information on a table area corresponding to the one logical address range; and
when a list of logical addresses corresponding to the lost write data is stored in the selected block, update, based on the list in the selected block, the rebuilt latest address translation information such that a value indicating an error is associated with each of the logical addresses corresponding to the lost write data.

2. The memory system according to claim 1, wherein the controller is configured to:
in response to occurrence of the unexpected power loss, save the first list and the second list into the first block and the second block, respectively, by writing the first list and the second list into the first block and the second block, respectively, using power stored in a capacitor of the memory system.

3. The memory system according to claim 1, wherein the controller is configured to:
in response to occurrence of the unexpected power loss, write both the first list and the second list into a predetermined block of the nonvolatile memory, using power stored in a capacitor of the memory system; and
in response to restoration of the power to the memory system, save the first list and the second list into the first block and the second block, respectively, by copying the first list and the second list from the predetermined block to the first block and the second block, respectively.

4. The memory system according to claim 1, wherein the controller is configured to:
manage the update log indicating the update content of the address translation information on the first table area and the update log indicating the update content of the address translation information on the second table area, respectively, using a first log buffer and a second log buffer stored in the volatile memory;
in response to occurrence of the unexpected power loss,
when an unsaved update log which is not saved into the first block is present in the first log buffer, write the unsaved update log of the first log buffer into the first block, using power stored in a capacitor of the memory system; and
when an unsaved update log which is not saved into the second block is present in the second log buffer, write the unsaved update log of the second log buffer into the second block, using the power stored in the capacitor.

5. The memory system according to claim 1, wherein
the logical-to-physical address translation table includes a plurality of pieces of address translation information,
the first table area includes at least first address translation information and second address translation information among the pieces of address translation information,
the second table area includes at least third address translation information and fourth address translation information among the plurality of pieces of address translation information, and
the controller is configured to:
periodically perform the first processing by repeatedly performing processing of acquiring the first address translation information from the volatile memory; processing of writing, into the first block, the first address translation information and a first update log indicating an update content regarding all the address translation information on the first table area updated after acquisition of the first address translation information; processing of acquiring the second address translation information from the volatile memory; and processing of writing, into the first block, the second address translation information and a second update log indicating an update content regarding all the address translation information on the first table area updated after acquisition of the second address translation information; and
periodically perform the second processing by repeatedly performing processing of acquiring the third address translation information from the volatile memory; processing of writing, into the second block, the third address translation information and a third update log indicating an update content regarding all the address translation information on the second table area updated after acquisition of the third address translation information; processing of acquiring the fourth address translation information from the volatile memory; and processing of writing, into the second block, the fourth address translation information and a fourth update log indicating an update content regarding all the address translation information on the second table area updated after acquisition of the fourth address translation information.

6. The memory system according to claim 5, wherein the controller is configured to:
in rebuilding the first table area onto the volatile memory,
copy, from the first block to the volatile memory, latest second address translation information in the second address translation information stored in the first block and latest first address translation information in the first address translation information stored in the first block;
reflect, to the latest first address translation information on the volatile memory, a content of a latest first update log in the first update log stored in the first block;
reflect, to the latest first address translation information and the latest second address translation information on the volatile memory, a content of a latest second update log in the second update log stored in the first block; and
after the first table area is rebuilt,
update, based on the first list stored in the first block, the rebuilt first table area such that a value indicating an error is associated with each of logical addresses corresponding to the lost first write data.

7. The memory system according to claim 5, wherein the controller is configured to:
in rebuilding the second table area onto the volatile memory,
copy, from the second block to the volatile memory, latest fourth address translation information in the fourth address translation information stored in the second block and latest third address translation information in the third address translation information stored in the second block;
reflect, to the latest third address translation information on the volatile memory, a content of a latest third update log in the third update log stored in the second block; and
reflect, to the latest third address translation information and the latest fourth address translation information on the volatile memory, a content of a latest fourth update log in the fourth update log stored in the second block; and
after the second table area is rebuilt,
update, based on the second list stored in the second block, the rebuilt second table area such that a value indicating an error is associated with each of logical addresses corresponding to the lost second write data.

8. The memory system according to claim 1, wherein
the update log written into the first block indicates, per data to be written into the first logical address range, a logical address corresponding to the data and a physical address of a storage location in the nonvolatile memory determined as a write destination for the data, and
the update log written into the second block includes, per data to be written into the second logical address range, a logical address corresponding to the data and a physical address indicating a storage location in the nonvolatile memory determined as a write destination for the data.

9. The memory system according to claim 1, wherein
the update log written into the first block indicates, per data to be written into the first logical address range, a logical address corresponding to the data, a physical address of a storage location in the nonvolatile memory determined as a write destination for the data, and a size of the data, and the update log written into the second block includes, per data to be written into the second logical address range, a logical address corresponding to the data, a physical address indicating a storage location in the nonvolatile memory determined as a write destination for the data, and information indicating a size of the data.

10. The memory system according to claim 1, wherein
the first list includes a set of logical addresses left due to removal of a set of logical addresses each corresponding to write data of which writing is complete to the nonvolatile memory from a set of logical addresses each corresponding to the write data that has been received from the host and is to be written into the first logical address range, and the second list includes a set of logical addresses left due to removal of a set of logical addresses each corresponding to write data of which writing is complete to the nonvolatile memory from a set of logical addresses each corresponding to the write data that has been received from the host and is to be written into the second logical address range.

11. A method of controlling a memory system, the memory system including a nonvolatile memory and a volatile memory, the nonvolatile memory including a plurality of blocks, the method comprising:

managing address translation information indicating a correspondence between each of logical addresses in a logical address space and each of physical addresses of the nonvolatile memory, using a logical-to-physical address translation table stored in the volatile memory;

dividing the logical-to-physical address translation table into a plurality of table areas including at least a first table area corresponding to a first logical address range and a second table area corresponding to a second logical address range;

periodically performing first processing of writing, into a first block among the plurality of blocks, address translation information on the first table area acquired from the volatile memory and an update log indicating an update content of the address translation information on the first table area updated after acquisition of the address translation information on the first table area;

periodically performing second processing of writing, into a second block among the plurality of blocks, address translation information on the second table area acquired from the volatile memory and an update log indicating an update content of the address translation information on the second table area updated after acquisition of the address translation information on the second table area;

saving, into the first block and the second block, a first list indicating a list of logical addresses corresponding to first write data lost due to unexpected power loss among write data to be written into the first logical address range and a second list indicating a list of logical addresses corresponding to second write data lost due to the unexpected power loss among write data to be written into the second logical address range, respectively;

in response to restoration of power to the memory system,
  notifying a host that the memory system is ready to process an input/output command;
  when an input/output command specifying a logical address belonging to one logical address range of the first logical address range and the second logical address range is received from the host,
  selecting a block corresponding to the one logical address range from the first block and the second block, and rebuilding, onto the volatile memory, based on the address translation information on the table area stored in the selected block and the update log of the address translation information, stored in the selected block, latest address translation information on a table area corresponding to the one logical address range; and
  when a list of logical addresses corresponding to the lost write data is stored in the selected block, updating, based on the list in the selected block, the rebuilt latest address translation information such that a value indicating an error is associated with each of the logical addresses corresponding to the lost write data.

12. The method according to claim 11, wherein
the saving includes:
in response to occurrence of the unexpected power loss, writing the first list and the second list into the first block and the second block, respectively, using power stored in a capacitor of the memory system.

13. The method according to claim 11, wherein
the saving includes:
in response to occurrence of the unexpected power loss, writing both the first list and the second list into a predetermined block of the nonvolatile memory, using power stored in a capacitor of the memory system; and
in response to restoration of the power to the memory system, copying the first list and the second list from the predetermined block to the first block and the second block, respectively.

* * * * *